US005349730A

United States Patent [19]

Anderson et al.

[11] Patent Number: 5,349,730

[45] Date of Patent: Sep. 27, 1994

[54] METHOD AND APPARATUS FOR ASSEMBLING BLINDS

[75] Inventors: Richard N. Anderson, Whitesville, Ky.; Dan Hurt, Tupelo, Miss.; Dave Burtnett, Aberdeen, Miss.; Jay Gaskins, Tupelo, Miss.; Jim Wall, Shannon, Miss.

[73] Assignee: Hunter Douglas Inc., Upper Saddle River, N.J.

[21] Appl. No.: 28,791

[22] Filed: Mar. 9, 1993

[51] Int. Cl.[5] .......... B23P 19/04

[52] U.S. Cl. .......... 29/24.5; 29/702; 83/76.8

[58] Field of Search .......... 29/24.5, 23 Q, 241, 29/433, 559, 702; 83/76, 76.8, 76.9, 436, 446; 269/317

[56] References Cited

U.S. PATENT DOCUMENTS

| | | | |
|---|---|---|---|
| 2,827,686 | 3/1958 | Aldeman . | |
| 3,281,914 | 11/1966 | Hunter | 29/24.5 |
| 3,531,838 | 10/1970 | Peeters | 29/24.5 |
| 3,555,864 | 1/1971 | Wegner . | |
| 3,736,631 | 6/1973 | Edixhoven | 29/24.5 |
| 3,766,815 | 10/1973 | Edixhoven | 83/160 |
| 3,824,657 | 7/1974 | Nilsson | 29/24.5 |
| 4,070,937 | 1/1978 | Off et al. | 83/27 |
| 4,073,044 | 2/1978 | Edixhoven | 29/24.5 |
| 4,188,693 | 2/1980 | Edixhoven | 29/24.5 |
| 4,420,862 | 12/1983 | Edixhoven | 29/24.5 |
| 4,514,886 | 5/1985 | Edixhoven | 29/24.5 |
| 4,516,300 | 5/1985 | Gaillard et al. | 29/24.5 |
| 4,543,699 | 10/1985 | Anderson | 29/24.5 |
| 4,607,419 | 8/1986 | Köhler et al. | 29/24.5 |
| 4,615,087 | 10/1986 | Chang | 29/24.5 |
| 4,639,987 | 2/1987 | Georgopoulos | 29/24.5 |
| 4,711,005 | 12/1987 | Chang | 29/24.5 |
| 4,730,372 | 3/1988 | Tsuchida | 29/24.5 |
| 4,790,226 | 12/1988 | Tsuchida | 83/206 |
| 4,989,309 | 2/1991 | Pang | 29/24.5 |
| 5,022,296 | 6/1991 | Eschauzier et al. | 83/27 |

FOREIGN PATENT DOCUMENTS 713802 8/1954 United Kingdom .

*Primary Examiner*—Mark Rosenbaum
*Assistant Examiner*—S. Thomas Hughes
*Attorney, Agent, or Firm*—Gary M. Polumbus

[57] ABSTRACT

A method and apparatus for assembling blinds includes a punching and cutting station, an outfeed station and a lacing stating having a plurality of lacing towers. A guide cable extends between adjacent lacing towers for guiding transported slats. A pivoted backstop at a downstream end of the lacing station yieldingly arrests the motion of incoming slats. The outfeed station of the apparatus includes a continuously driven outfeed drive roller and an opposed pinch roller which may be selectively urged against the drive roller so as to drive a slat out of the outfeed station. Each lacing tower of the apparatus includes a spring-biased spreader which provides longitudinal tension to a tape ladder while preventing longitudinal stringers of the ladder from converging upon each other. The method of the present invention includes operating the apparatus to automatically learn the selected length and arrangement of the blind and to subsequently automatically manufacture a blind to those specifications.

14 Claims, 11 Drawing Sheets

Fig_9
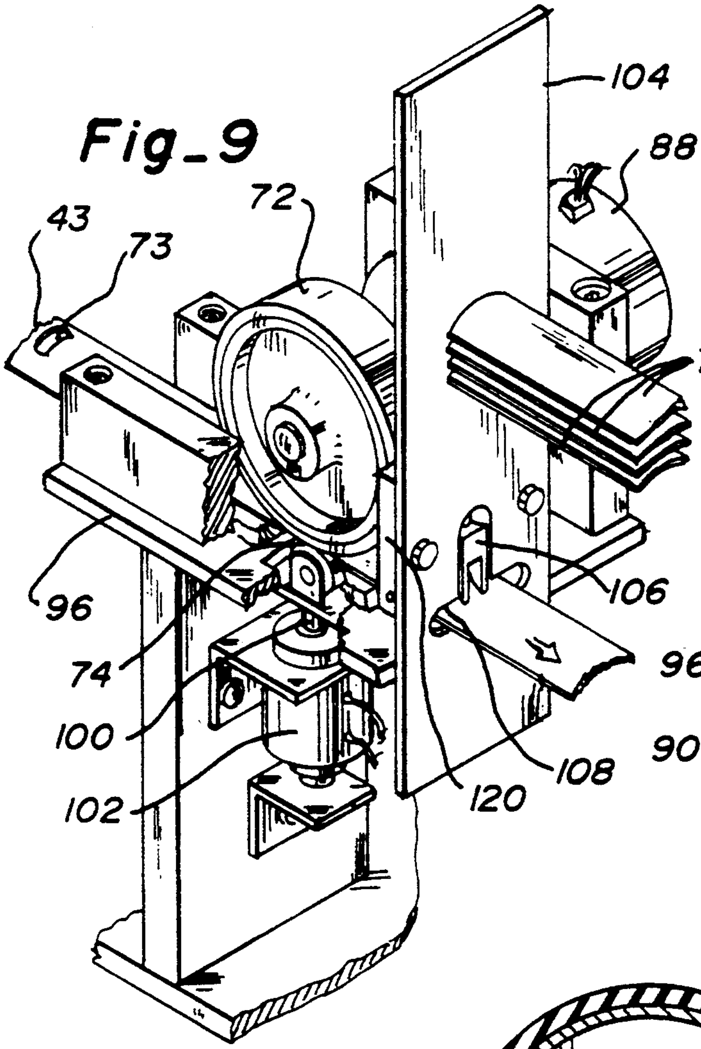
Fig_6
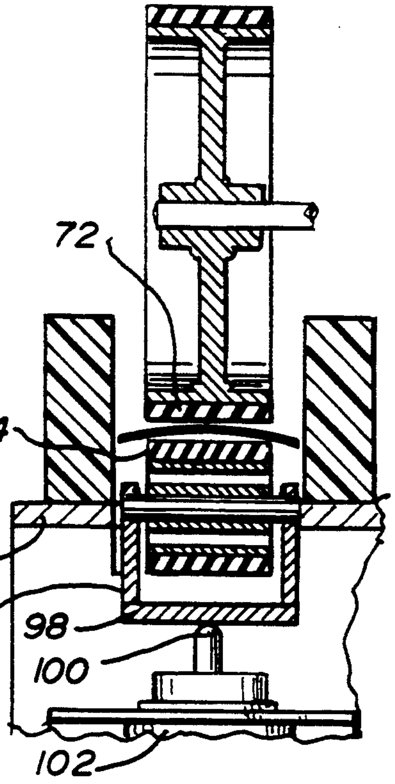
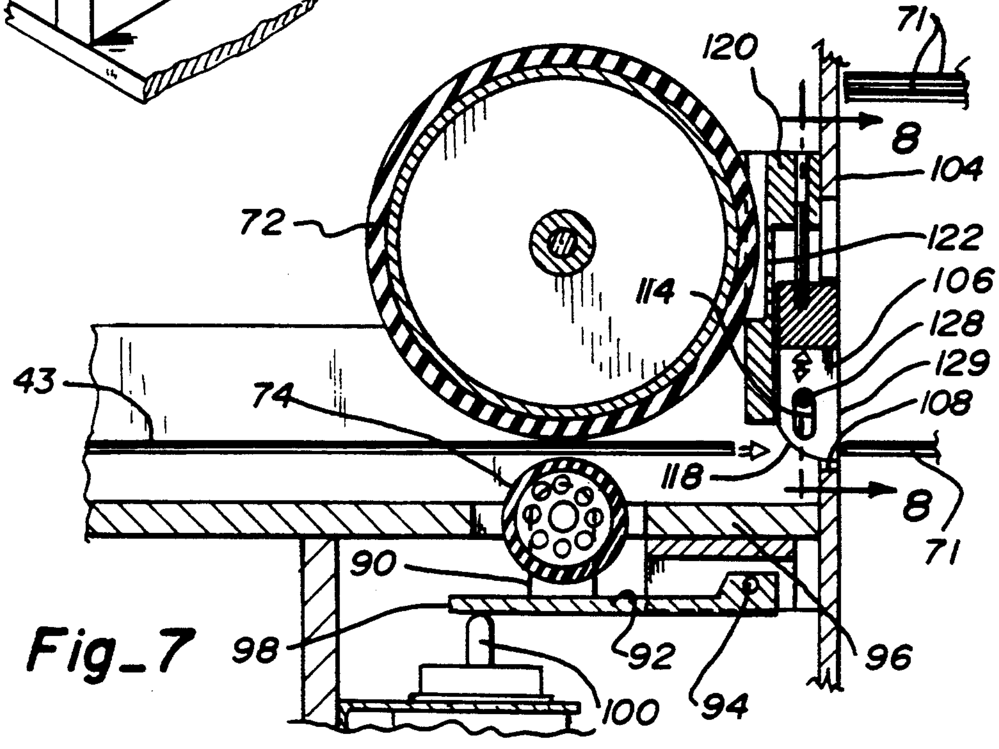
Fig_7

Fig_19
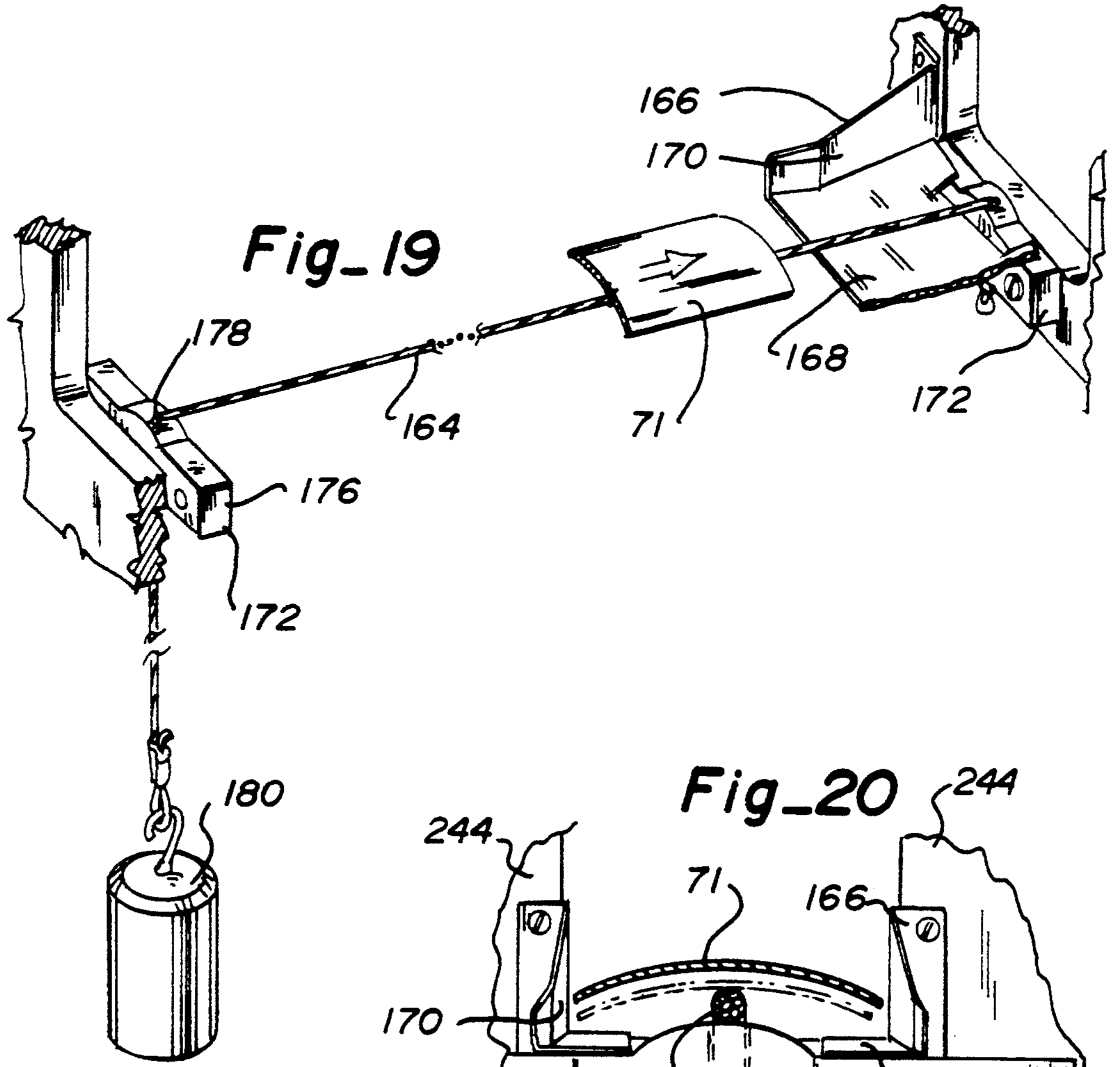
Fig_20
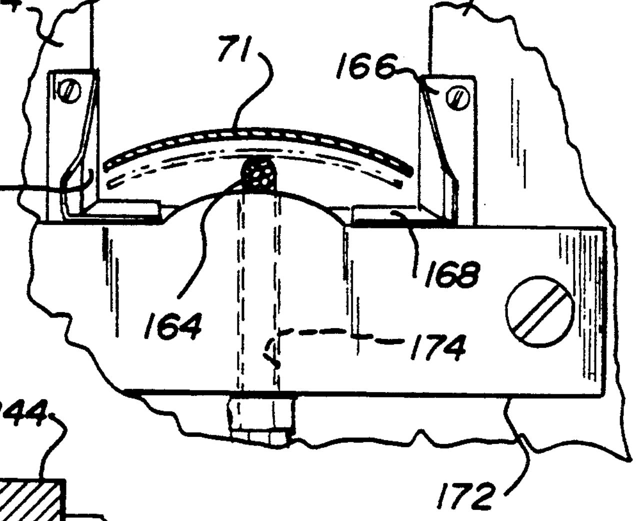
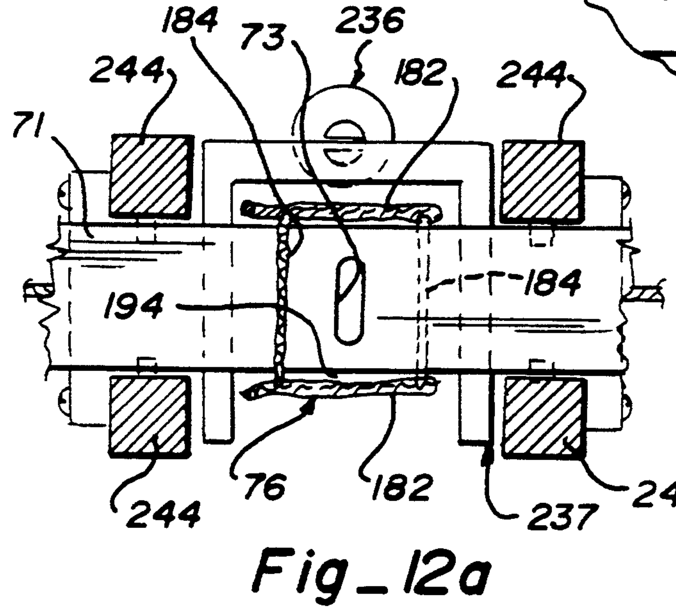
Fig_12a

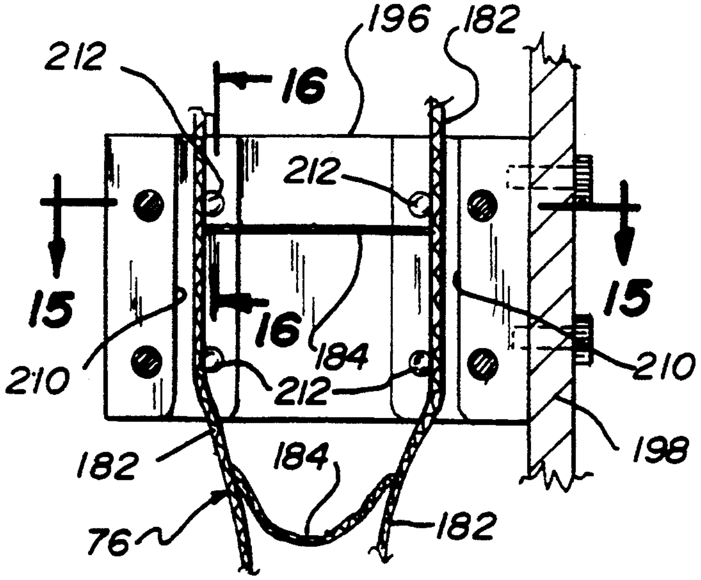
Fig_14
Fig_15
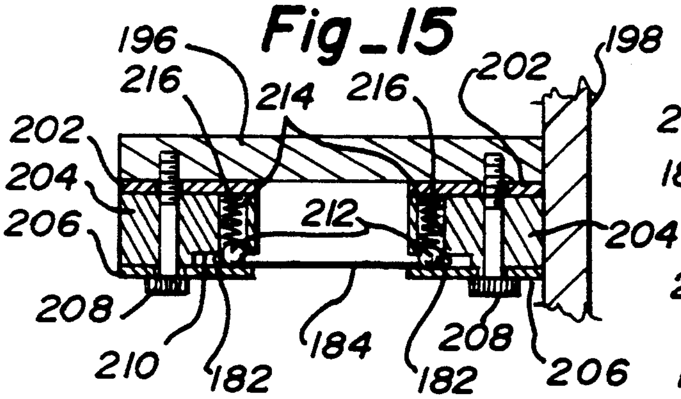
Fig_18
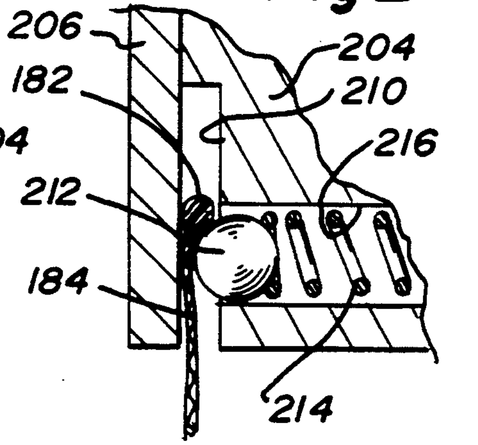
Fig_16
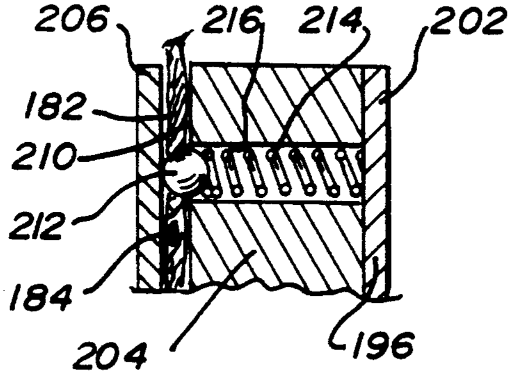
Fig_17
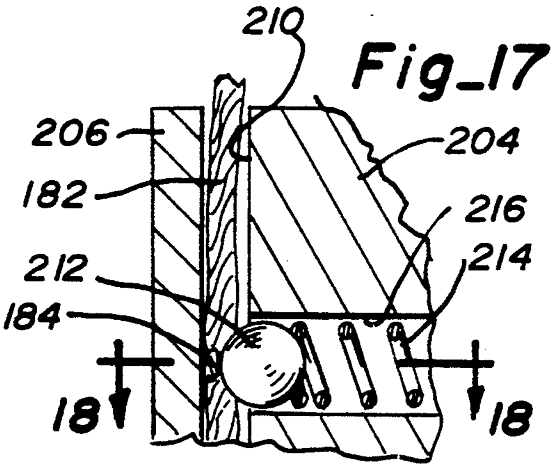

METHOD AND APPARATUS FOR ASSEMBLING BLINDS

BACKGROUND OF THE INVENTION

1. Field of the Invention

The present invention relates generally to venetian blinds of the type having a plurality of parallel horizontal slats that may be set simultaneously at any of several angles so as to vary the amount of light admitted through the blind. More specifically, the invention pertains to a new and improved method and apparatus for assembling such blinds.

2. Discussion of the Prior Art

Venetian blinds have been in existence for over 200 years and generally include a horizontal support structure located at the top of the blind and attached to a support surface by support brackets. Suspended from the support structure are a multitude of parallel horizontal slats which commonly have a slight curvature in the transverse direction. The slats are held in place by two or more tape ladders suspended from the support structure. Each slat is supported by a separate rung of the tape ladder such that by shifting vertical runs of the tape ladders, the slats can be tilted by pivoting them about their longitudinal axes. A plurality of lift cords are disposed within corresponding holes punched through the slats. A knot is provided in the lift cord and disposed underneath the lowermost slat so that when the opposite end of the lift cord is pulled, the lowermost slat is lifted upward toward the support structure so as to collect each of the above slats in a stacked relationship. The position of the lift cord can be fixed by use of a brake disposed within the support structure. Thus, the position of the lowermost slat can be set.

Numerous examples of prior art devices for assembling and manufacturing such venetian blinds can be found in U.S. Pat. Nos. 3,281,914, 3,555,864, 3,824,657, 4,073,044, 4,790,226 and 4,730,372, in addition to Great Britain patent 713,802. Typically, these machines include a supply station, a forming station, an accumulator station, a punch/cut station and a lacing station. The supply station contains a continuous coil or roll of aluminum slat material. From the supply station, the slat material is fed into the forming station where a slight transverse curvature is applied to the slat material by mating rollers having convex and concave outer surfaces. After the slat material is formed, it is fed into an accumulator station where a predetermined length of slat material is maintained in reserve in a single loop so as to satisfy the demands of downstream drive wheels. The drive wheels are located at the entrance of the punch/cut station and serve to feed the slat material from the accumulator into the punch/cut station at predetermined intervals and at accelerated speeds. The punch/cut station includes a cutting substation and at least two punching substations. These substations cut the slat into predetermined lengths and punch holes through the slat into which the lift cords may be placed. At the exit of the punch/cut station is another drive wheel which, at predetermined intervals, feeds the cut and punched slat out of the punch/cut station and into the lacing station. The lacing station typically includes two or more lacing towers, each tower having a continuous supply of tape ladder material. Disposed in each lacing tower are a plurality of lifts and spring-loaded latches for supporting the cut slats after they have been inserted into the tape ladders and lifted to an elevated position. The cut slats are inserted into the tape ladders and the lifts are then used to lift the slats vertically past the latches so as to temporarily store the slats with previously processed slats. The tape ladder is woven slightly along the longitudinal axis of the slats by alternately moving the tape ladder back and forth as each new slat is fed into the tape ladder. As a result of this weaving, the cross rungs of the tape ladder are displaced from the vertical axis of the tape ladder so that a vertical opening is created along the vertical axis into which a lift cord for the blind may later be placed.

These prior art machines and methods for assembling venetian blinds have several limitations and problems. Most importantly, many of the machines must be operated at a relatively slow speed in order to accurately cut the blinds and reliably assemble them into the tape ladders without causing breakage of slats. One specific problem is accurately locating the slat material in the punch/cut station at a high rate of speed. When the drive wheels placing the slat material into the punch/cut station operate by accelerating and retarding at a relatively slow speed, there is little slippage between the drive wheels and the slat material. However, when the slat material is moved at a greater speed, the slippage between the wheels and the slat material becomes significant due to the inertia of the slat material during both starting and stopping.

A further problem with high speed operation involves the control of the cut slats upon being fed into the lacing station. At high speeds, the slats have a tendency to fly out of their intended path through the lacing station and become damaged as a result. In addition, prior art machines have typically included a fixed backstop to abruptly stop the movement of the slats once they reach the end of the lacing station so that they can be properly positioned for lacing and stacking. However, as the slats are fed into the lacing station at relatively higher speeds, they may be damaged, broken or rebound out of the desired position when they strike the fixed backstop.

Solutions have been developed to address some of these problems. To compensate for the slip in the drive wheels caused by high speed movement, a manual method for measuring and compensating for the slippage was developed and disclosed in previously mentioned U.S. Pat. No. 4,790,226. This method involves operating the assembly machine to first feed one slat all the way through the machine to the lacing station. The operator then manually measures the length of the first cut slat and if there is any error or deviation from the requested length, he/she manually inputs, via a keyboard on a control panel, the error percentage so that the computer associated with the assembly machine can compensate for this error with the remaining slats.

To address the flying slat problem, past machines have provided certain guide means which typically have included a pair of slanted deflector plates located above and below the intended path of the slat and located immediately adjacent to each of the lacing towers as disclosed in previously mentioned U.S. Pat. No. 4,730,372. However, to applicant's knowledge, no continuous guide has been provided in prior art systems which would be desirable to maintain control of the slats through the entire process. In order to address these problems, and others, and to achieve an improved method and apparatus for assembling blinds, the following invention has been developed.

SUMMARY OF THE INVENTION

The method and apparatus of the present invention constitute improvements to prior art machines for assembling window coverings commonly referred to as venetian blinds by addressing several shortcomings found in prior art systems. The apparatus of the present invention, in which the method of the invention is practiced, includes a plurality of operative sequential stations through which the slat material for a blind passes as it is being formed from a roll of strip blind material. A blind is formed by taking a rolled supply of slat material, advancing the strip material through a leveling station which reverses the bend in the material inherent therein as a result of its storage on the supply roll, passing the strip through a forming station where a transverse curvature is placed in the strip material before it is fed into an accumulator where a single loop of material is stored to provide for later accelerated processing of the strip. At the outlet from the accumulator, a stepper motor receives the strip material and accelerates it at a faster speed than it was previously processed into a punch/cut station where the strip is initially positioned and cut at a leading end while simultaneously punching a hole near the leading end for receiving a lift cord. The strip is then accelerated to a second and possibly subsequent locations for the punching of additional holes depending upon the number of pull cords to be provided in the completed venetian blind. Finally, the slat is rapidly accelerated to a stacking or lacing station. As the slat is receiving punched holes subsequent to the initial punched hole, and as it is being advanced into the lacing or stacking station, it is fed through a plurality of tape ladders which are subsequently used to tilt the slats in the completed blind in a conventional manner.

The present invention provides an improvement over the prior art by providing a new and improved system for setting up and calibrating the machine so that slats are properly positioned in the lacing station for lacing and stacking purposes. Means are provided in a control unit such that an initial slat is fed through the system at a slow rate to make predetermined measurements before a subsequent slat is advanced through the machine at a much faster rate to account for slippage. The two readings are processed in the control unit so that the machine becomes properly programmed for handling subsequent slats at a rapid rate. The present invention also includes improvements in the lacing towers of the lacing station such that the tape ladders are properly spread and tensioned to receive slats which are fed to the lacing station in a dependable manner.

The invention further provides a new and improved backstop against which slats are abutted as they are accelerated into the lacing station with the backstop being designed to absorb the inertia of the slats so that they do not rebound out of position within the lacing station. A gate is further provided at the entry to the lacing station which immediately closes upon the entry of a slat into the lacing station so as to arrest any rebound resulting from inertia that is not absorbed by the new and improved backstop.

Other aspects, features and details of the present invention can be more completely understood by reference to the following detailed description of the preferred embodiment, taken in conjunction with the drawings, and from the appended claims.

DETAILED DESCRIPTION OF THE DRAWINGS

FIG. 6 is an enlarged section taken along line 6—6 of FIG. 4.

FIG. 7 is an enlarged section taken along line 7—7 of FIG. 5.

Figure 8A:
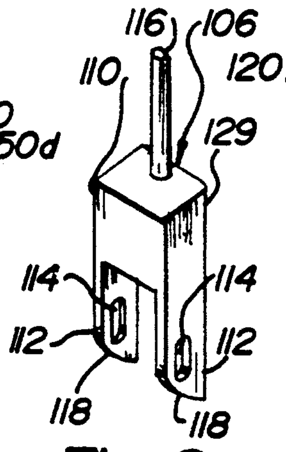
FIG. 8 is a section taken along line 8—8 of FIG. 7.

FIG. 8*a* is an isometric view of the guillotine gate at the entry to the lacing station in the apparatus.

FIG. 9 is an isometric view of the portion of the apparatus at the entry end of the lacing station.

Figure 2:
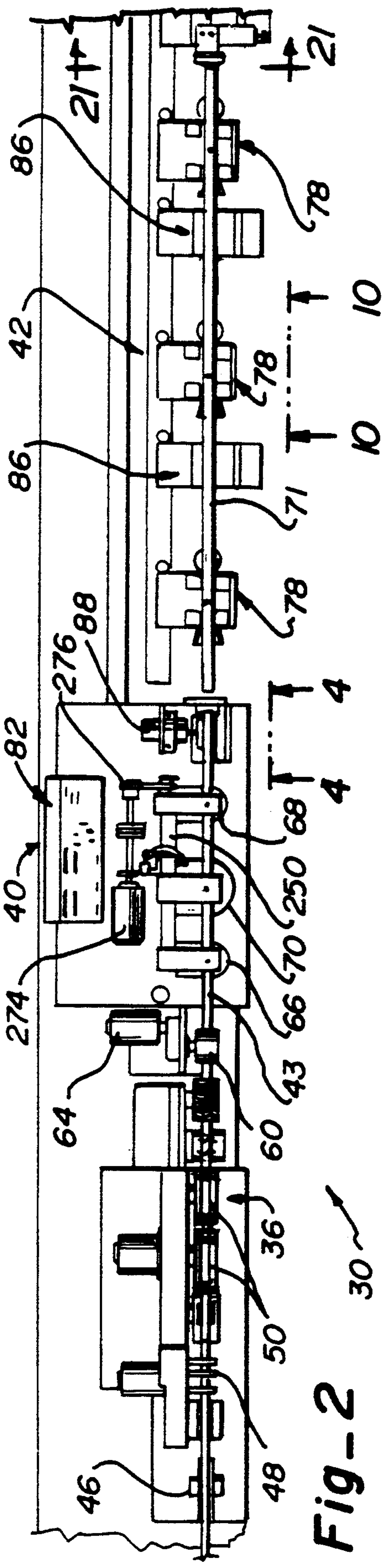
FIG. 2 is a top plan view of the apparatus as shown FIG. 1.
Figure 10:
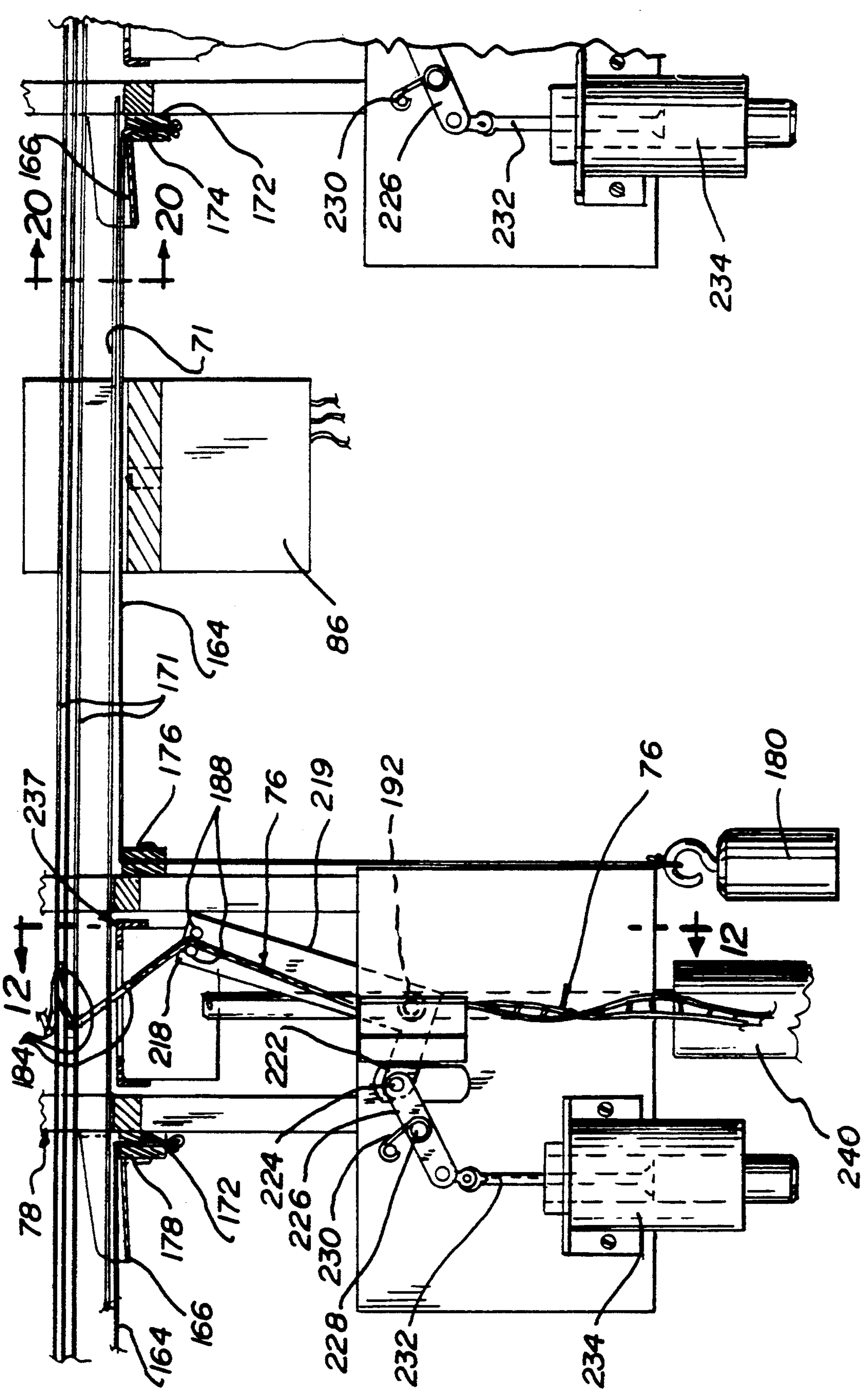

FIG. 10 is the vertical section taken along line 10—10 of FIG. 2.

Figure 11:
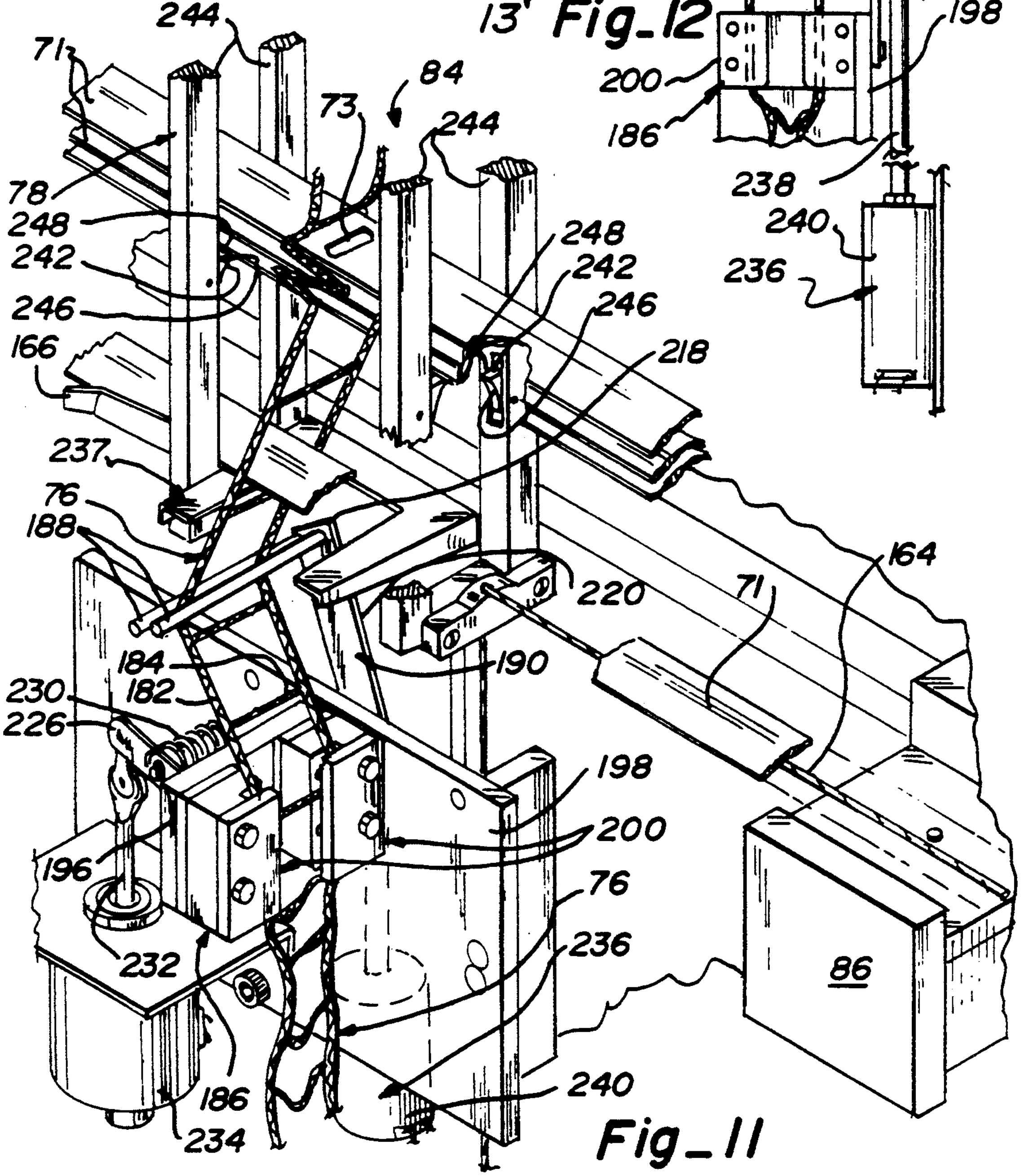

FIG. 11 is an enlarged isometric view of one lacing tower in the lacing station illustrating the new and improved means for spreading and tensioning the tape ladder.

Figure 12:
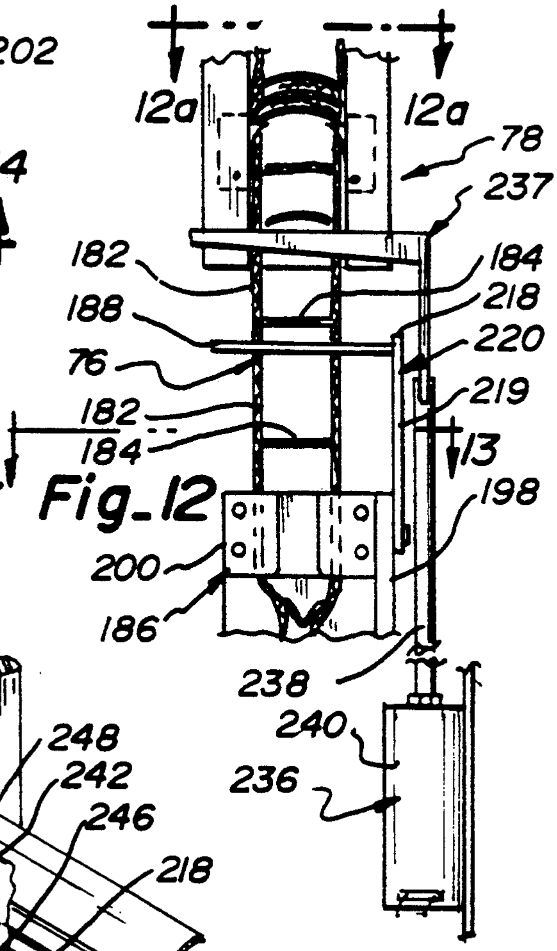

FIG. 12 is a section taken along line 12—12 of FIG.

FIG. 12*a* is a section taken along line 12*a*—12*a* of FIG. 12.

Figure 13:
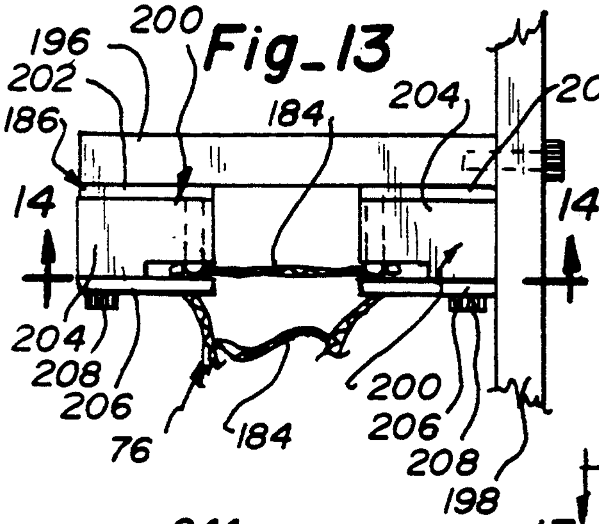

FIG. 13 is an enlarged section taken along line 13—13 of FIG. 12.

FIG. 14 is a section taken along line 14—14 of FIG. 13.

FIG. 15 is a section taken along line 15—15 of FIG. 14.

FIG. 16 is a section taken along line 16—16 of FIG. 14.

FIG. 17 is an operational sectional view similar to FIG. 16 and having been enlarged to show the passage of a rung and a tape ladder past a tensioner within the lacing station.

FIG. 18 is a section taken along line 18—18 of FIG. 17.

FIG. 19 is a fragmentary view with parts removed illustrating the system employed for guiding slats into the lacing station.

FIG. 20 is an enlarged section taken along line 20—20 of FIG. 10.

Figure 21:
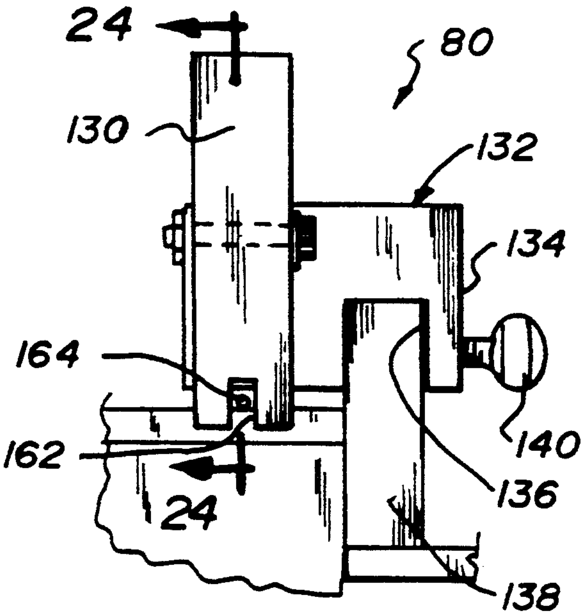

FIG. 21 is an enlarged view taken along line 21—21 of FIG. 2.

Figure 22:
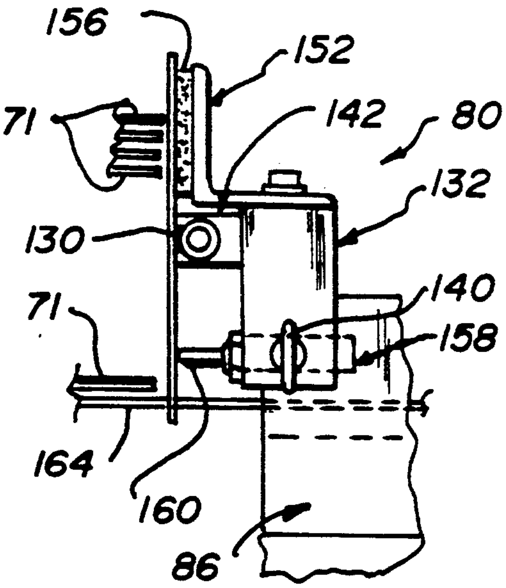

FIG. 22 is a side elevational view of the backstop employed to absorb linear movement of the slats after they have been advanced into the lacing station.

Figure 23:
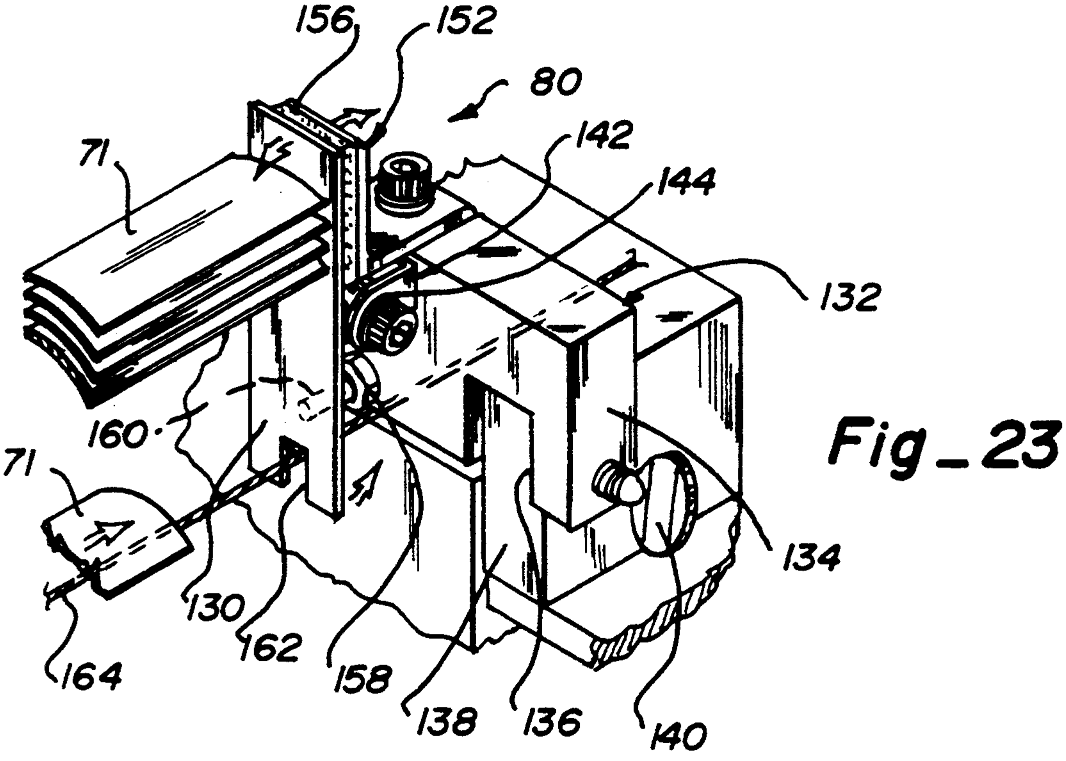

FIG. 23 is a fragmentary isometric view of the backstop shown in FIG. 22.

Figure 24:
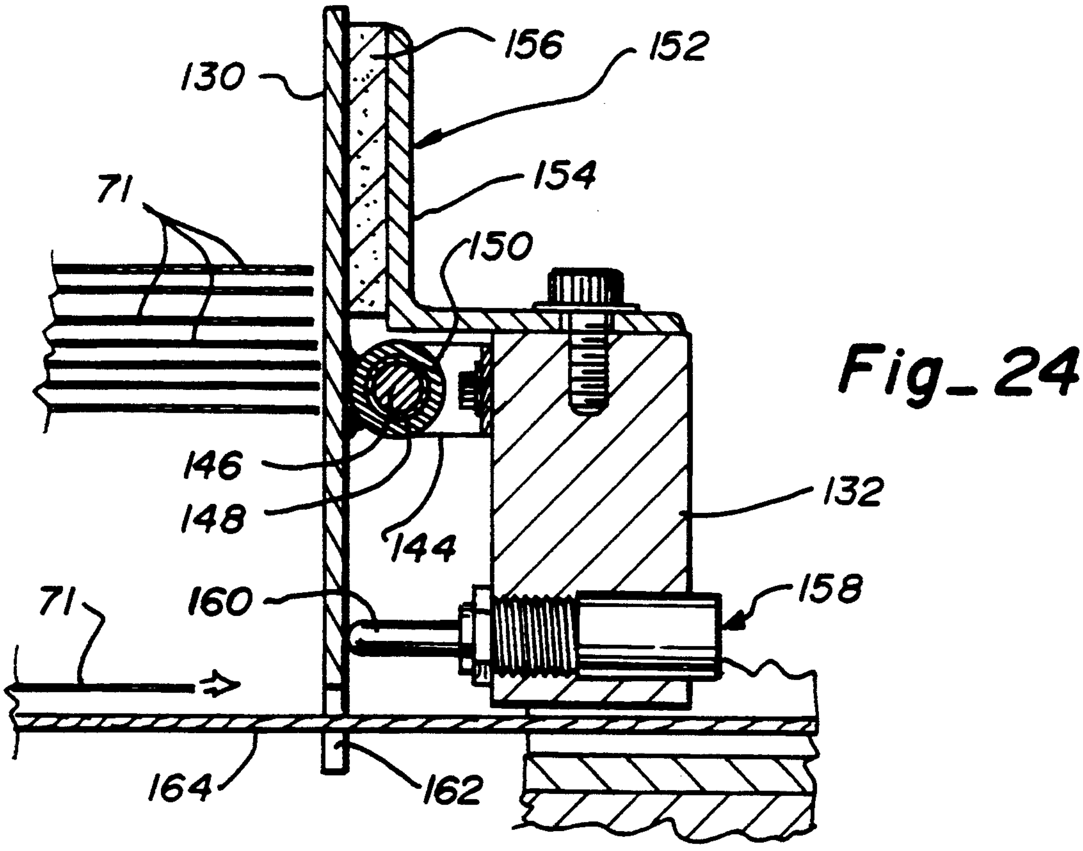

FIG. 24 is an enlarged section taken along line 24—24 of FIG. 21.

Figure 25:
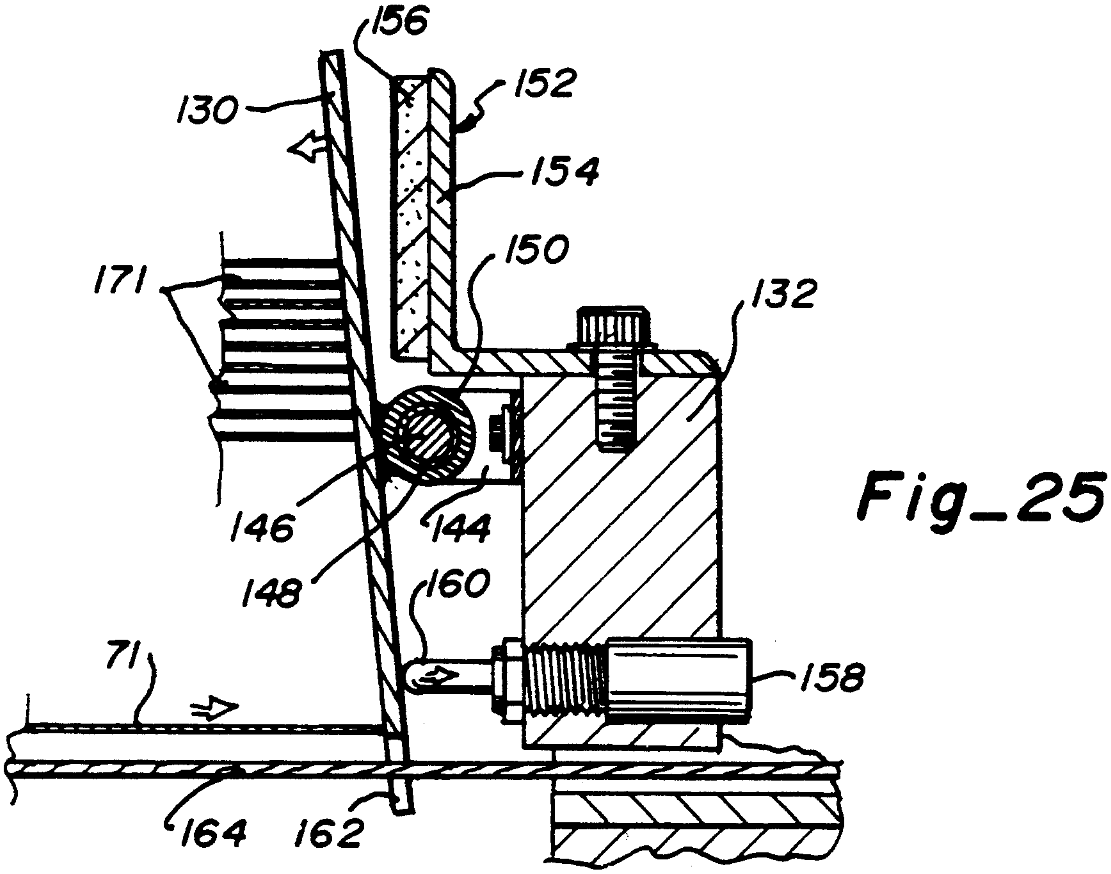

FIG. 25 is a section similar to FIG. 24 showing the backstop in a second operative position.

Figure 26:
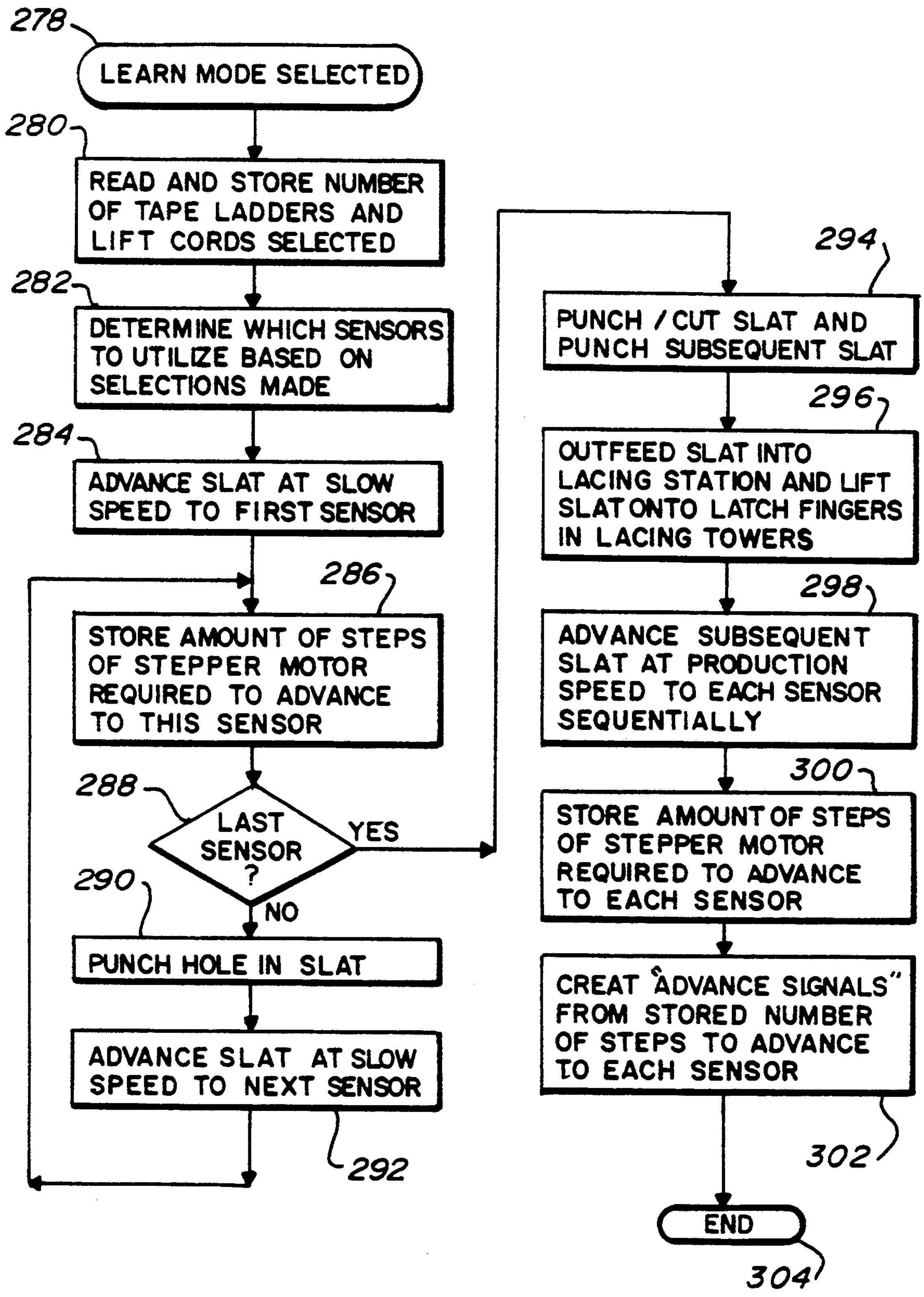

FIG. 26 is a box diagram diagrammatically illustrating the computer controlled learn mode operation of the apparatus of The invention.

Figure 27:
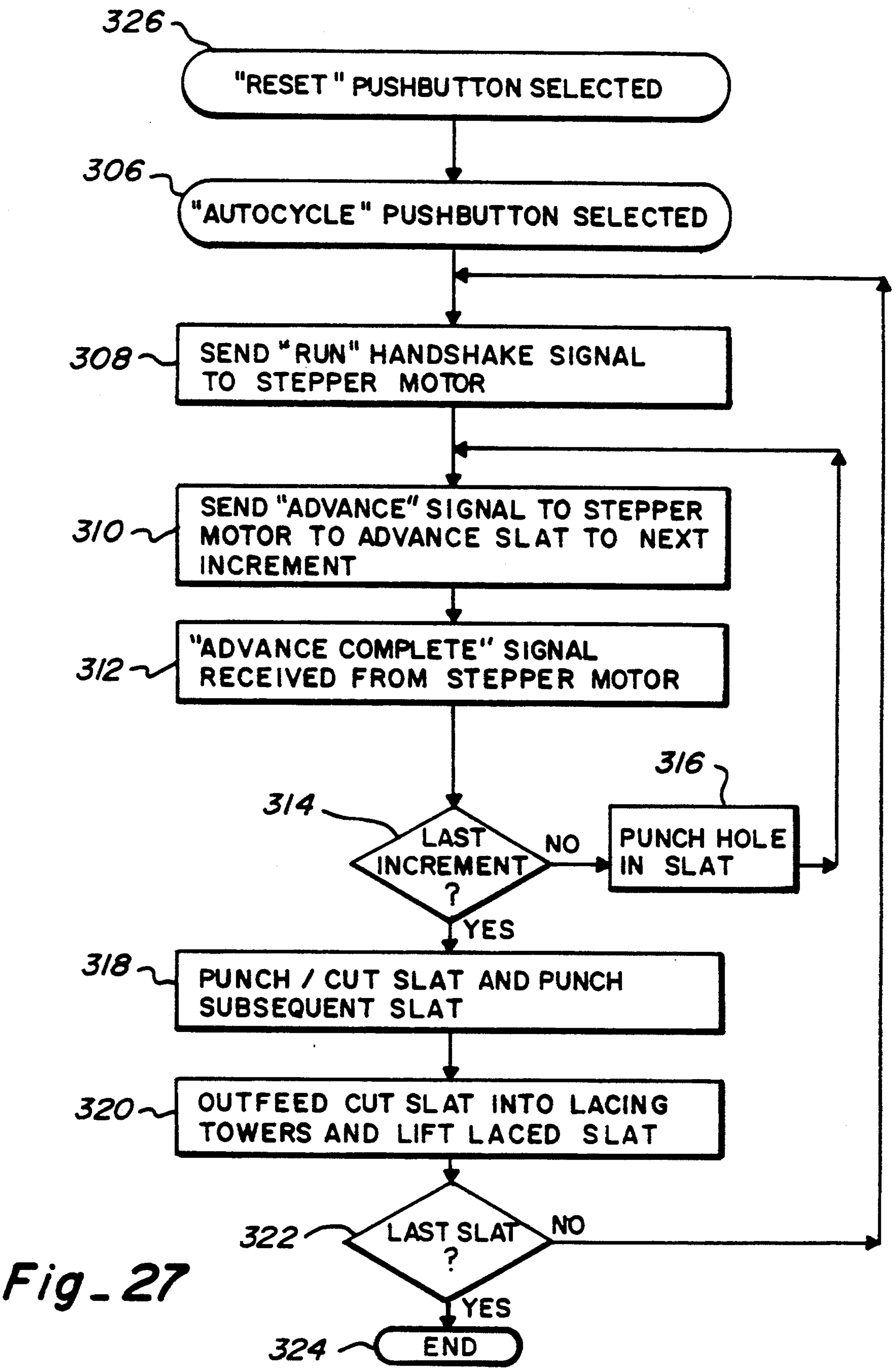

FIG. 27 is a box diagram diagrammatically illustrating the computer controlled production operation of the apparatus of the present invention.

DESCRIPTION OF THE PREFERRED EMBODIMENT

Figure 1:
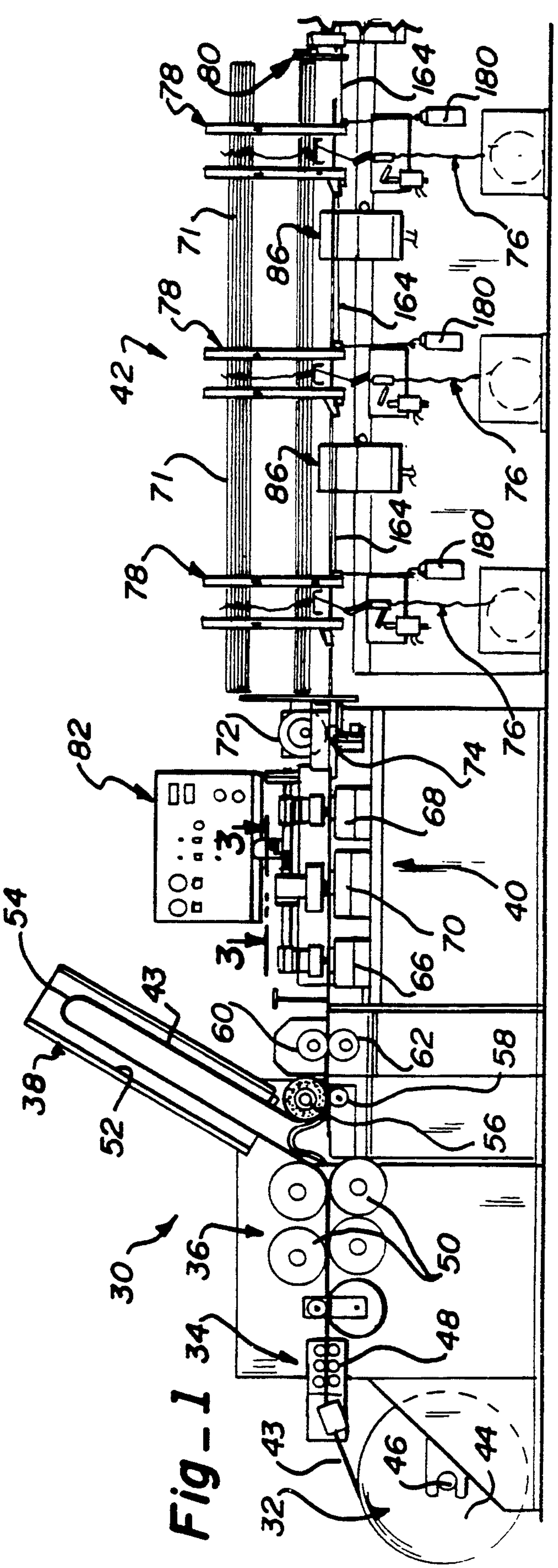
FIG. 1 is a front elevation of a slat assembly apparatus in accordance with the present invention showing the various processing stations.

An apparatus 30 for assembling venetian blinds and the like is illustrated in FIGS. 1 and 2 to include a supply station 32, a leveling station 34, a forming station 36, an accumulator station 38, a punch/cut station 40, and a lacing station 42. This general assemblage of processing stations for assembling blinds is broadly known in the art and is disclosed in related U.S. Pat. Nos. 3,555,864 and 4,073,044 which are hereby incorporated by reference.

Before describing the improvements to such prior art machines in accordance with the present invention, it is deemed appropriate to facilitate an understanding of the invention to generally describe the processing of slat material at each station within the apparatus 30.

Strips 43 of aluminum material or the like from which blinds of the venetian type are made are typically supplied in large supply rolls 44 which are stored at the supply station 32 on a rotatable shaft 46. The leading end of the strip of material on a roll is fed through the leveling station 34 where a plurality of upper and lower longitudinally offset rollers 48 are positioned to receive the strip material from the supply roll 44 and reversely bend the material to remove the innate bend that is found in the material due to its storage in a coiled condition on the supply roll. After leaving the leveling station 34, the strip material passes through a conventional forming station 36 where mating upper and lower rollers 50 having convex and concave surfaces create a transverse bend in the strip material which is desired for the final configuration of the slats in a venetian blind. An upwardly extending chamber 52 is provided at the accumulator station 38 so that a length of material emanating from the forming station 36 can be stored in a single loop 54 within the chamber. The storage is necessary since, as will be appreciated with the description of the apparatus to follow, subsequent operations process the strip material in a non-continuous manner at an accelerated rate relative to the processing of the material through the leveling and forming stations.

Immediately upon leaving the accumulator station 38, the strip material passes between a pair of idler rollers 56 and 58 the upper one 56 of which has a felt surface or the like which removes dust and other similar material from the surface of the strip material. After passing through the idler rollers 56 and 58, the material is pinched between a pair of drive wheels 60 and 62 the lower one 62 of which is an idler wheel with the upper one 60 being fixed to the output shaft of a stepper motor 64. However, with minor modifications the stepper motor could be linked to both drive wheels to positively drive each wheel.

The stepper motor 64 feeds the strip material in predetermined intervals into the punch/cut station 40 where first and second die punchers 66 and 68 respectively are disposed upstream and downstream from a central cutter 70. The central cutter is adapted to cut the continuous strip of material into slats 71 of predetermined length while the punchers selectively punch holes 73 for pull cords or lift cords (not shown) as will be described in more detail later. After leaving the punch/cut station 40, the slats of material which have been cut from the continuous strip of material are fed by an outfeed drive roller 72 and an outfeed pinch roller 74 into the lacing station 42 which is designed such that longitudinal movement of a slat into the lacing station automatically feeds the slat through a plurality of vertically disposed and horizontally spaced tape ladders 76. The tape ladders are supported in lacing towers 78 within the lacing station in a manner to be described in more detail later. Near the terminal or downstream end of the lacing station a backstop 80, which is longitudinally adjustable within the apparatus to accommodate various lengths of slats 71, is positioned to abut the lead end of each slat fed to the lacing station.

Before proceeding with a detailed description of the features of the present invention which are felt to distinguish it from the prior art, it is possibly helpful to recognize that venetian blinds can be formed of many different widths and heights and accordingly, a computerized control system housed in a control unit 82 for the apparatus has been designed to automatically accept information and process such depending upon the width and height of venetian blinds desired. It will also be appreciated that depending upon the width of a venetian blind to be formed in the apparatus, it may be desired to have various numbers of tape ladders 76 as well as pull cords (not shown) for operating the blind. This also is accommodated by the computerized control system for the apparatus of the present invention in a manner which will become more clear later. Each lacing tower 78 in the apparatus, with the exception of the most upstream lacing tower, has a sensor 86 which may be in the form of a photoelectric sensor associated therewith. The tower and sensor combinations are longitudinally adjustable within the lacing station 42 apparatus so as to be positionable at desired locations for properly positioning the tape ladders and pull cords in accordance with desired specifications.

As mentioned previously, the punch/cut station 40 in the apparatus 30 includes first and second die punchers 66 and 68 respectively and a central cutter 70 which cooperate in punching holes in the strip material and cutting the strip material into desired lengths as predetermined and controlled by the computerized control system for the apparatus. Before more specifically describing the specific components of the punch/cut station, it is felt desirable to describe in further detail components of the apparatus which are downstream from the punch/cut station.

As mentioned previously, once the trailing end of a slat 71 has been cut by the central cutter 70, a forward portion of the slat is positioned between the outfeed rollers 72 and 74 which selectively grip the slat and are capable of accelerating the slat into the lacing station 42. The outfeed rollers are probably best shown in FIGS. 7, 8 and 9. The relatively large outfeed drive roller 72 has a gripping outer surface of rubber or the like adapted to frictionally engage the slats for positive engagement therewith. The outfeed drive roller is continuously rotatively driven by an outfeed motor 88 at a predetermined speed which generates a linear speed for the slat that is faster than the speed at which the strip material from the supply roll 44 is fed to the accumulator station 38 of the apparatus. The pinch roller 74 is an idler roller and is positioned immediately beneath the relatively large outfeed drive roller. The pinch roller is pivotally mounted in a yoke 90 on a substantially horizontally disposed pivot arm 92 with the pivot arm being pivotally mounted on a horizontal pivot pin 94 secured to a framework 96 for the apparatus as best shown in FIG. 7. A distal end 98 of the pivot arm 92 is positioned immediately above the uppermost end of an actuator arm 100 of a vertically mounted solenoid 102 so that activation of the solenoid causes the actuator arm 100 to move upwardly, pivoting the pivot arm 92 and the pinch roller 74 mounted thereon in a clockwise direction. Thus, the pinch roller can be selectively urged toward the outfeed drive roller. Deactivation of the solenoid 102 allows the pinch roller to drop by gravity out of engagement with the slat 71. It will be evident that the pinch roller 74, upon engagement with the slat will move the slat slightly upwardly into engagement with the continuously rotating outfeed drive roller 72 so that the slat is gripped therebetween and immediately advanced in a downstream direction into the lacing station.

Figure 8:
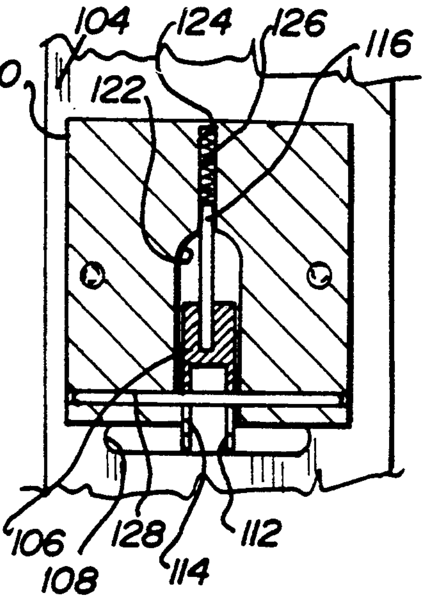
Figure 4:
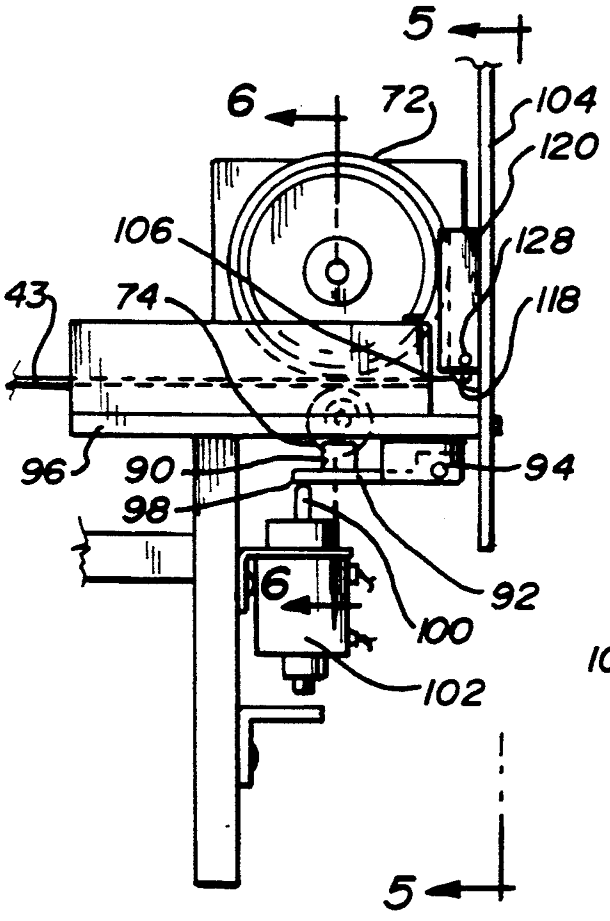
FIG. 4 is an enlarged front elevational view taken along ling 4—4 of FIG. 2.
Figure 5:
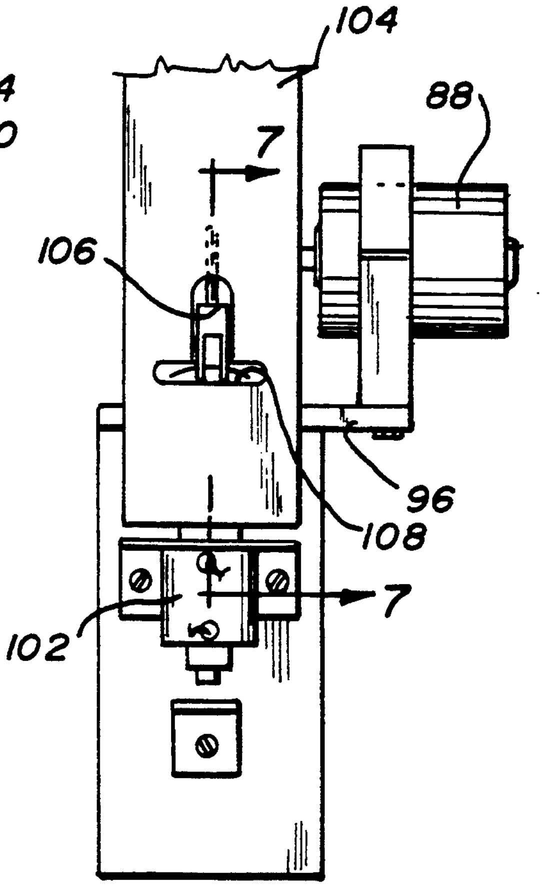
FIG. 5 is a view taken along line 5—5 of FIG. 4.

At the input end of the lacing station 42, as best seen in FIGS. 8 and 8*a*, a vertical plate 104 on the framework 96 separates the lacing station from the outfeed rollers 72 and 74 and mounted on the vertical plate 104 is a guillotine gate 106 which is designed and mounted for reciprocatory vertical movement to open and close a passage 108 in the plate 104 through which the slats 71 are advanced into the lacing station. The gate may be gravity-driven or spring-biased into a closed position. The gate comprises a main body 110 having vertically depending spaced legs 112 with oblong slots 114 formed therein and a vertical guide pin 116 projecting upwardly from the main body 110. Lower edges of the spaced legs 112 have arcuate cam surfaces 118 which are exposed in an upstream direction. The cam surfaces are normally positioned in alignment with the slats 71 being advanced into the lacing station so as to be engaged by the leading edge of a cut slat entering the lacing station. A bracket 120 mounted on the upstream side of the plate 104 (FIGS. 4 and 8) has a recess 122 formed therein to slidably receive the main body of the gate. A cylindrical blind hole 124 extends upwardly into the bracket 120 from the recess 122 and is adapted to receive and guide the vertical guide pin 116 on the gate so that the gate is guided in reciprocatory, vertical linear movement. In a spring-biased arrangement of the gate, a very light coil spring 126 is seated in the upper end of the blind hole so as to exert a mild downward bias on the guide pin so as to urge the gate into its closed position blocking the passage 108. A horizontal locator pin 128 is also disposed within the bracket 120 and projects through the oblong slots 114 in the spaced legs 112 of the main body to further control and guide the vertical reciprocatory movement of the gate.

As is probably best appreciated by reference to FIG. 7, as the leading end of a slat 71 is advanced by the outfeed rollers 72 and 74 toward the lacing station 42, the leading edge of the slat engages the cam surfaces 118 on the lower edges of the gate 106 thereby driving the gate upwardly against gravity or against the bias of the coil spring 126, whichever the case may be to open the passage 108 through the plate 104 into the lacing station. Once the trailing edge of a cut slat has passed the gate, the gate drops into its closed or blocking position so as to prevent a slat that has entered the lacing station from rebounding in a reverse upstream direction back out of the lacing station. The downstream side of the gate has a flat surface 129 so that the gate cannot be cam driven upwardly by a slat which has already entered the lacing station. As will be better appreciated from the description of the operation of the apparatus to follow, the gate is important as the slats are fed into the lacing station at a very high rate of speed and when they abut the backstop 80 at the downstream end of the lacing station, they will sometimes rebound and the gate prevents any such rebound from allowing the slat to regress from the lacing station.

The backstop 80 as mentioned previously is longitudinally adjustably mounted near the downstream end of the lacing station 42 so as to form an abutment against which incoming slats 71 engage to properly position the slats within the lacing station. The backstop is shown best in FIGS. 21 through 25 and with reference to FIG. 23, it can be seen to include a pivotal backstop plate 130 mounted on a support assembly 132. The support assembly includes a block 154 having a downwardly opening slot 136 therethrough which adapted to ride on a vertically oriented longitudinal frame member 138 of the frame 96 of the apparatus. A set screw 140 positively positions the block relative to the frame member 138 in a conventional manner. It will be apparent that by loosening the set screw, the block can be slid along the frame member to any desired location depending upon the width of a venetian blind to be assembled within the lacing station. Once the block is properly positioned, the set screw can be tightened to positively position the block and consequently the backstop plate 130 relative to the frame.

A bifurcated support 142 is secured to the upstream face of the block 134 in any suitable manner and has upstream projecting laterally spaced arms 144 which support a horizontal pivot pin 146 and bearing 148. The pivot pin and bearing support between the arms 144 a horizontal sleeve 150 welded to the rear face of the backstop plate 130 so that the plate is disposed for pivotal movement about the horizontal pivot pin 146. An L-shaped bracket 152 is secured to the surface of the mounting block 134 and carries on the upstream face of a vertical leg 154 a positioning or cushioning pad 156 of foam rubber or the like.

The sleeve 150 is positioned at approximately the longitudinal center of the vertically-extending backstop plate 130. The rear face of an upper portion of the backstop plate abuts the positioning pad 156 when the backstop plate vertically oriented in a neutral position and the plate is held in a vertical orientation by a horizontally oriented shock absorbing assembly 158 mounted within the mounting block adjacent to the lower edge of the backstop plate. The shock absorbing assembly has a forwardly projecting pin 160 that yieldingly allows the backstop plate to pivot slightly in a counterclockwise direction as viewed in FIG. 22 against the bias of the shock absorbing assembly. The shock absorbing assembly has a neutral position in which it holds the backstop plate in its neutral vertical orientation. The projecting pin 160 on the assembly, after having been retracted, will again extend to reposition the backstop plate 130 in its neutral vertical position. The shock absorbing assembly 158 may be of the type manufactured by Humphrey Products of Kalamazoo, Mich. under Series HKSHA.

It will also be appreciated that the lower end of the backstop plate 130 is aligned with incoming previously cut slats 71 so that as the slats engage the lower end of the backstop plate, it is allowed to pivot slightly against the resistance of the shock absorbing assembly. This causes the motion of the slat to be yieldingly arrested which helps in preventing the slats from rebounding as has been a prevalent problem in prior art machines. The lower edge of the backstop plate is vertically notched at 162 to receive a cable or guide wire 164 which, as will be explained in more detail later, is provided within the lacing station 42 to prevent the slats 71 from flying off course as they are accelerated into the lacing station.

The operation of the backstop 80 is probably best illustrated in FIGS. 24 and 25 with FIG. 24 illustrating the neutral position of the backstop plate 130 and showing a slat 71 being advanced theretoward. FIG. 25 shows the slat having engaged the lower end of the backstop plate pivoting it in a counterclockwise direction against the resistance of the shock absorbing assembly 158. Momentarily after this engagement, however, the shock absorbing assembly returns the backstop plate to its neutral, vertical orientation of FIG. 24. As will be explained hereafter, after the slat is positioned in the lacing station, it is lifted vertically into stacked relationship with previously cut and processed slats which are shown in FIGS. 24 and 25 in a stacked relationship commencing at approximately the longitudinal vertical center of the backstop plate.

As probably best seen in FIGS. 10, 11, 19 and 20, the system employed in the apparatus of the present invention to control and properly guide movement of the slats into the lacing station is illustrated. The system includes a plurality of the cables 164 that are substantially horizontally disposed and which extend between adjacent lacing towers 84 in the lacing station 42 and guide troughs 166 at each tower. The troughs can be seen in FIGS. 19 and 20 to include a bottom plate 168 which is sloped slightly downwardly in an upstream direction and a pair of outwardly flared side walls 170. Ideally, the troughs would never engage a slat but in practice, slats which enter the lacing station in a slightly divergent path may engage a trough which assists in realigning the slats so that they pass in a relatively straight linear path into the lacing station where they subsequently abut the pivoted backstop 80.

One problem with rapid processing of slats is that they tend to become airborne if the leading end of the slat gets elevated. To prevent the leading end from elevating, the cables 164 are positioned between each tower 84 so as to engage the trailing end of a slat if the leading end elevates. By preventing the trailing end from dropping downwardly, the leading end is prevented from elevating and thus possibly flying into an undesired position within the lacing station. Another problem with incoming slats is that sometimes the leading end of a slat may tend to droop. The cables reduce and control this problem as well.

The cables 164 also provide lateral guidance of the incoming slat due to the transverse bend or crowned cross-section of the slat created by the forming station 36. The cable is located below the transverse center of the incoming slat. If the uppermost point on the crown of the underside of the slat contacts the cable, then the transverse curvature of the slat will tend to prevent lateral motion of the slat relative to the cable.

The cables 164 are anchored at a downstream end in a lacing tower 84 on a bracket 172 which supports the guide trough 166 for that tower. The cable extends downwardly through a hole 174 in the bracket and a knot is provided on the end of the cable to prevent the cable from moving upwardly through the hole. From its connection to the trough 166 at a downstream lacing tower, the cable extends upstream and slopes slightly downwardly before being received in a similar mounting bracket 176 on the downstream side of the next adjacent upstream tower. This bracket 176 also has a vertical hole 178 therethrough which receives the cable so that the cable depends downwardly from the bracket and a free weight 180 is suspended therefrom to maintain desired tension in the cable. As mentioned above, the cable is positioned so as to be centrally located transversely of a slat as is best shown in FIG. 20.

The apparatus 30 of the present invention further includes an improved system for spreading and tensioning the tape ladders as slats 71 are laced thereinto. The system is best illustrated in FIGS. 10 through 18. As probably best seen in FIGS. 10 and 11, a supply of conventional tape ladder 76 having flexible longitudinal stringers 182 and transverse cross rungs 184 is fed upwardly from a location beneath the apparatus into a ladder spreader 186 which spreads the vertically running stringers to their maximum separation. As can be appreciated, the stringers 182 are restricted in lateral outward movement by the transverse rungs 184 which are longitudinally and equally spaced along the length of the stringers. As will be appreciated hereafter, the rectangular openings defined by the stringers and the rungs are adapted to receive slats of a venetian blind as it is being assembled.

After passing through the ladder spreader 186 which will be described in more detail hereafter, the tape ladder 76 extends upwardly between spaced guide fingers 188 of a ladder guide 190 which is pivotally mounted above the ladder spreader for pivotal movement about a horizonal shaft 192 to reciprocally shift the tape ladder passing therethrough between horizontally spaced positions. The tape ladder is shifted so that adjacent slats 71 in a blind have associated rungs 184 of the tape ladder slightly displaced longitudinally thereof to facilitate stacking of the slats and to provide a vertical pathway or channel 194 (FIG. 12*a*) between rungs through which pull cords (not shown) can be threaded as will be described hereafter. The rungs are therefore positioned alternatively on opposite sides of the punched holes 73 in the slats which are adapted to receive the pull cords as best seen in FIG. 11. In other words, it is desirable to have alternate rungs of the ladder on opposite sides of the pull cords so that the ladder remains in a fixed position on the finished blind product. It will be appreciated with a further description of the method and apparatus of the invention that tape ladders are not necessarily only positioned on the slats at the location of pull cords but where they are, the rungs of the ladder are alternatively positioned on opposite sides of the pull cord, unless a pull cord is not provided for a particular tape ladder.

Looking more particularly at the ladder spreader 186 in FIGS. 11 through 18, it can be seen to include a back or base plate 196 vertically disposed and projecting laterally away from a larger base plate 198 on the framework 96 of the apparatus. The back plate 196 carries two horizontally spaced spreader assemblies 200 each of which has an assembly plate 202, a main block 204 and a cover plate 206. Each spreader assembly 200 is secured to the back plate 196 by a pair of vertically spaced fasteners 208. As probably best seen in FIGS. 11 and 13, the main blocks 204 are notched in one face so as to provide a groove which cooperates with the cover plate 206 in defining a channel 210 through which a stringer 182 of a tape ladder passes. The stringer retained in the channel by a pair of vertically spaced spring biased metal retention balls 212 which are biased or yieldingly urged against the cover plate by coil springs 214 disposed in cylindrical passages 216 which extend through the associated main block. To facilitate mounting of the assemblies 200 on the back plate, the assembly plate 202 is positioned across the rear face of the main block 204 to hold the coil springs 214 in the cylindrical passages 216 and the cover plate is positioned on the opposite face of the main block to retain the retention balls 212 in operative engagement with the coil spring. The entire assembly is then secured to the back plate with the fasteners 208.

As shown in FIGS. 14 and 15, there are vertically aligned pairs of the spring biased retention balls 212 in each channel 210 and the tape ladder is positioned in the channels such that the stringers 182 are on the outwardmost side of the retention balls. In order to fully comprehend the operation of the ladder spreader, it is to be appreciated that the longitudinal stringers of a tape ladder are of a larger diameter than the cross rungs 184. The spring bias placed on the retention balls is predetermined so that a rung will pass between a retention ball and the cover plate 206 by overcoming the bias of the spring, but a stringer 182 will not, due to its larger diameter. In this manner, the tape ladder can be advanced longitudinally through the ladder spreader by allowing subsequent rungs to sequentially pass between the retention balls and the cover plates with slight yielding resistance while at the same time, the stringers are retained in a laterally spaced orientation by the lateral spacing of the retention balls.

As best illustrated in FIG. 11, as the tape ladder 76 is fed to the ladder spreader 186, the stringers 182 are not spread but rather the entire ladder is in a collapsed state. As it passes through the spreader, the retention balls 212 force the stringers into an optimal maximally spaced orientation and the slight resistance that is placed on each rung 184 of the tape ladder as it advances through the ladder spreader allows the tape ladder to be vertically tensioned between the ladder spreader and an upper location within a lacing tower 84 where the assembled slats have been stacked as will become more clear later.

The operation of the spreader can be appreciated by specific reference to FIGS. 16 through 18 wherein it can be seen in FIGS. 17 and 18, for example, that a stringer 182 is retained outwardly of the retention balls 212 as a rung 184 is passing between the retention balls and the cover plates 206. FIG. 16 is a view similar to FIG. 17 with the rung positioned immediately before encountering a retention ball.

The ladder guide 190, best seen in FIGS. 10, 11 and 12, as mentioned previously, includes a pair of spaced horizontal guide fingers 188 in the form of cylindrical rods which are mounted on the distal end 218 of a substantially vertical leg 219 of a pivotal guide arm 220. The opposite end of the vertical leg 219 has an integral substantially horizontal leg 222 pivotally mounted on a horizontal pivot pin 224. The horizontal shaft 192 about which the guide arm 222 pivots is disposed at the juncture of the integral vertical and horizontal legs of the guide arm.

The pivot pin 224 is fixed to one end of a rocker arm 226 which is centrally mounted on a horizontal pivot shaft 228 that carries a torsion spring 230 biasing the rocker arm in a counterclockwise direction. The opposite end of the rocker arm is pivotally connected to the upper free end of the actuating arm 232 of a vertically mounted solenoid 234 such that activation of the solenoid 234 overcomes the bias of the torsion spring 230 and drives the actuating arm 232 upwardly pivoting the rocker arm in a clockwise direction which causes the ladder guide arm 220 to pivot counterclockwise moving the guide fingers 188 through an arc in a counterclockwise direction. It will be evident that deactivation of the solenoid 234 allows the bias of the torsion spring to force a reverse movement of the component parts so that the guide fingers can be reciprocally moved in an arcuate path by activation and de-activation of the solenoid.

As can be appreciated, the reciprocal arcuate movement of the guide fingers shifts the tape ladder 76 in a horizontal direction back and forth. This operation is coordinated with the advancement of slats into the lacing station in a manner to be described later. As mentioned previously, by shifting the ladder back and forth with the ladder guide, each adjacent rung 184 of the tape ladder is longitudinally offset relative to a slat positioned therebetween so that a vertical pathway 194 between adjacent rungs is established for receipt of a pull cord.

After a slat 71 has been properly positioned in the lacing station having been inserted between adjacent rungs of tape ladders 76 associated with each lacing tower 84, the slat rests upon the framework 96 of the apparatus within the lacing station 42. The slats are stacked and accumulated above this position and in order to move the most recently processed slat into stacked relationship with previously processed slats, each lacing tower includes a lift mechanism 236 having a generally U-shaped horizontally disposed lift arm 237 that is mounted on the upper end of the actuating arm 238 of a vertically oriented solenoid 240 secured to the framework of the apparatus. One such lift mechanism is illustrated in FIGS. 10, 11 and 12.

The U-shaped lift arm 237 is positioned beneath the most recent slat delivered to the lacing station 42 and upon activation of the solenoid 240, the lift arm associated with each lifting tower lifts the slat upwardly until it passes latch fingers 242 disposed on tower uprights 244 associated with each lacing tower 84. The latch fingers shown best in FIG. 11 are spring biased fingers having inwardly and downwardly directed cam surfaces 246 which allow the fingers to be temporarily forced by a slat into a retracted position within the associated tower upright against the bias of a coil spring (not shown). Once the slat is advanced past the latch finger, it rests upon a horizontal flat top surface 248 of each latch finger in underlying stacked relationship with previously stacked slats. It will be appreciated that as a slat is lifted by the lift mechanism, it engages the rung 184 on the tape ladder 76 immediately thereabove, thereby pulling the tape ladder upwardly through the ladder spreader 186 and the ladder guide 190 so that the tape ladder is properly positioned to receive the next slat to be processed.

After a predetermined number of slats have been assembled in the lacing station 42, the assemblage of slats is manually removed from the apparatus and taken to another location where pull cords (not shown) are laced through the punched holes provided in the slats. Rigid top and bottom rails (not shown) are assembled with the slats at the same time. The pull cords extend vertically through the aligned holes in the slats and in the vertical passages 194 defined between the offset rungs of the tape ladders. The bottom end of each pull cord is knotted within the bottom rail so that as the pull cords are pulled upwardly through conventional pulleys in the top rail (not shown), the slats are sequentially accumulated on top of each other in a conventional manner.

Figure 3:
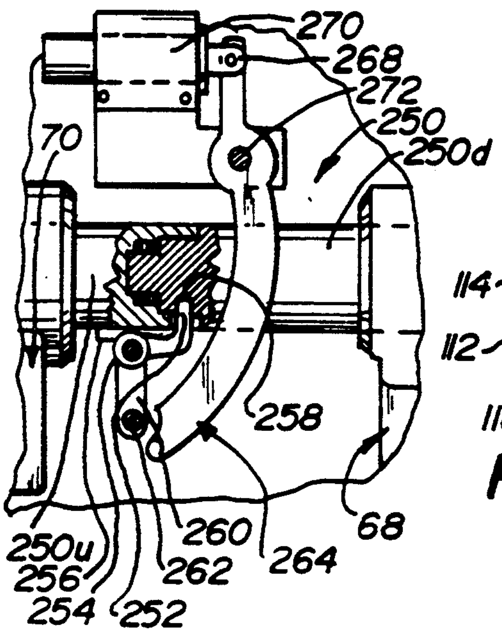
FIG. 3 is an enlarged section taken along line 3—3 of FIG. 1.

Before describing in more detail the method of the present invention as practiced with the apparatus, a better understanding of the punch/cut station 40 is required (FIGS. 1, 2 and 3). As mentioned previously, the punch/cut station includes a centrally disposed cutter 70 and first and second punchers 66 and 68 respectively adapted to punch the holes 73 through a slat at predetermined locations. The first puncher 66 is disposed upstream from the cutter and is mounted on a common horizontal shaft 250 at a fixed spacing from the cutter. The shaft 250 is selectively pivotable about its longitudinal axis in a conventional manner so as to move the cutter and the first puncher downwardly into operative engagement with an underlying strip of material when desired.

As best shown in FIG. 3, the shaft 250 is bifurcated at a location downstream from the cutter 70 so as to define upstream and downstream shaft segments **250*u* and 250*d* respectively. The downstream shaft segment 250*d* is pivotally mounted in a conventional manner within the downstream end of the upstream segment 250*u* so that the upstream and downstream segments are physically permitted to pivot independently. A lock finger 252 is provided to releasably secure the shaft segments together for unitary pivotal movement under specified and predetermined conditions. The lock finger, as seen in FIG. 3, is of generally L-shaped configuration and is mounted on a horizontal pivot pin 254 which has a torsion spring 256 biasing the lock finger in a counterclockwise direction. One end of the lock finger has a projection 258 adapted to project into aligned radial openings provided in the first and second shaft sections so that when the projection 258 is received in the openings, the shaft sections are joined for unitary pivotal movement. The opposite end 260 of the lock finger has an upwardly extending pin 262 adapted to be engaged by an arcuate pivot arm 264 which is attached at its opposite end to the free end of the actuating arm 268 of a solenoid 270. The pivot arm 264 is pivotally supported between its ends on a vertical pivot shaft 272. Activation of the solenoid 270 pivots the pivot arm 264 in a clockwise direction as seen in FIG. 3 causing the arm to engage the pin 262 on the lock finger 252 to disengage the shaft segments. Deactivation of the solenoid allows the torsion spring 256 to pivot the lock finger in a counterclockwise direction thereby driving the pin 262 against the pivot arm 264 to also move the pivot arm in a counterclockwise direction which reactively resets the solenoid. In this manner, it can be appreciated that upon activation of the solenoid, the shaft segments are disengaged and upon deactivation, they are again reengaged. The engagement and disengagement of the shaft segments is provided so that the second puncher 68 which is downstream from the cutter 70 does not always have to be activated with the cutter and the first puncher (which always operate together) but can be activated with the second puncher if desired. A punch/cut motor 274, FIGS. 1 and 2, is operatively connected to the downstream shaft segment 250*d* through an eccentric cam and clutch system 276 such that any time the motor is activated, the second puncher 68 is operated and dependent upon the connect or disconnect status of the upstream shaft segments, the cutter 70 and the first puncher 66 are operated with the second puncher. This entire mechanism is controlled by the computerized control system housed in the control unit 82** in a manner to be described hereafter.

OPERATION

The apparatus 30 of the present invention can be configured to manufacture blinds of various widths. In the preferred embodiment it is designed to manufacture blinds having widths between twelve and one-half and one hundred forty-four inches. As many as seven and as few as two tape ladders and lift cords may be used on a blind. The number of lift cords may be fewer than or equal to the number of tape ladders used.

Before activating the apparatus, an operator places a pre-cut bottom rail (not shown) for the blind to manufactured into the lacing station 42 of the machine and adjusts the positions of the lacing towers 84 and the pivoted backstop 80 so that the lacing towers are aligned with predetermined locations on the bottom rail for attaching the tape ladders and pull cords. The sensors 86 move with their corresponding lacing towers. The operator then removes the pre-cut bottom rail and selects the number of slats 71 needed to complete the blind, the number of tape ladders 76 for the blind, and the number of lift cords for the blind through thumb-wheel switches on the control unit 82. A "learn mode" is then selected on the control unit so that the computer in the control unit may "learn" the location of the adjusted sensors 86 and calculate a slip ratio (FIG. 26).

After the learn mode is selected (278), the computer reads the thumb-wheel switch settings on the control unit and stores the number of tape ladders and lift cords selected (280) by the operator. With this information, the computer is able to determine (282) which sensors to utilize in the learn mode. For example, if the operator has selected a three tape ladder blind, the lacing station should include three lacing towers with all but the first lacing tower having a sensor attached thereto. If the operator has selected a blind with two lift cords and three tape ladders, he/she may not require a lift cord in the center tape ladder of the blind and thus, a hole does not need to be punched in the slats at this position. Accordingly, the first sensor (associated with the second lacing tower) will not be utilized. On the other hand, if the operator selects three lift cords and three tape ladders, a hole 73 would need to be punched at three locations and each of the two sensors would be utilized. The computer determines which of the sensors to utilize dependent upon the manually inputted data.

The computer next commands the stepper motor 64 to advance (284) the strip material at a very slow speed until the first utilized sensor 86 senses that the leading edge of the material is directly above the sensor. The motion of the material is halted at this point and the computer stores (286) the number of steps of the stepper motor required to advance to this sensor. The computer then checks (288) to see if this is the last sensor to be utilized for the blind. If it is not, the computer commands the second puncher to punch (290) a hole in the slat. This is done by disengaging the two shaft segments **250*u* and 250*d* as previously described. The uncut slat is next advanced (292) at the same relatively slow speed to the next sensor. The computer again stores (286) the number of steps of the stepper motor required to advance to this sensor. The computer again tests (288) to see if this is the last sensor. If it is not, the computer continues with the loop of operations just described. If this is the last sensor, the computer commands the cutter and both punchers to operate (294**), thus punching a final hole in the material from which the first slat is found, cutting the material at the trailing end of the slat formed thereby and punching a first hole in the following material from which the next slat is to be formed. The cut slat is next outfed (296) completely into the lacing station 42, where it is fully laced into the tape ladders 76 and lifted onto the latch fingers of the lacing towers 84.

Next, a similar process occurs with the material for the subsequent slat except that the material is driven at production speed rather than at the relatively slow speed of the first processed slat. From empirical experience, the computer is programmed to expect a slip ratio within a certain range, e.g. eighty to eighty-five percent. The computer commands the stepper motor 64 to accelerate (298) at the production rate and to decelerate to stop the leading edge of the material at or before the first sensor using the most conservative slip ratio expected, e.g. expecting a slip ratio of eighty percent, the stepper motor is commanded to step eighty percent of the steps required at the slow speed. The leading edge of the material is then slowly advanced (298) to the sensor and the total number of steps of the stepper motor needed to get to the first sensor is then stored (300). This is done for each of the sensors and holes 73 are punched as appropriate. After the "production speed" slat has been. outfed and laced into the tape ladders, the computer can create (302) advance signals containing the number of steps required to advance the material for each subsequent slat to each sensor at production speed. The learn mode cycle is over (304) at this time.

An auto-cycle push button on the control panel may then be selected (306) to complete production of the blind, as shown in FIG. 27. The computer sends (308) a "run" handshake signal to the stepper motor. The computer next sends (310) an "advance" signal to the stepper motor corresponding to the number of steps required to advance the material for the next slat to the next increment. After the stepper motor has completed this advance, it sends (312) an "advance complete" signal back to the computer. Once the computer has received the advance complete signal it determines (314) whether or not this is the last increment which the material will need to move before being outfed. If it is not, a hole 73 is punched (316) in the slat with the second puncher 68 and another advance signal is sent (310) to the stepper motor. The cycle repeats until the computer does determine (314) that the material for the slat has advanced to its last increment. At that point, the computer commands (318) the punch/cut station to punch a last hole in the material for the slat, as well as cut the material for the slat and punch a first hole in the material from which the next slat is to be formed. Next, the cut slat is outfed (320) into the lacing station where it is laced into the tape ladder and lifted onto the latch fingers of the lacing towers. The computer then determines (322) if this is the last slat to be punched, cut and laced for this blind. If it is not, the process of commanding the stepper motor to advance material for a subsequent slat is begun again. If it is the last slat, this process is completed (324).

If a second blind is to be assembled with the same configuration of sensors, the learn mode need not be repeated. Instead, the operator selects (326) the reset button prior to selecting the auto-cycle button. The reset button resets the counter counting the number of slats for the blind as well as reads the number of tape ladders, lift cords, and slats desired for the next blind. Further, it may be desirable, at periodic intervals during the manufacture of blinds, to have the computer control system perform a check of the continued accuracy of the number of steps of each "advance signal" by having the sensors sense if the leading edge of the slat is in the correct position at each desired stopping point for a punch or punch/cut operation. The computer can then adjust the subsequent advance signals accordingly.

A presently preferred embodiment of the present invention has been described above with a degree of specificity. It should be understood, however, that this degree of specificity is directed toward the preferred embodiment. The invention itself, however, is defined by the scope of the appended claims.

The invention claimed is:

1. An apparatus for assembling blinds from slat material, comprising:
 - supply means for supplying a continuous length of slat material;
 - punching and cutting means downstream from said supply means operatively connected to the supply means and receptive of the slat material for punching holes in the slat material at predetermined positions and for cutting the slat material into slats of predetermined length;
 - outfeed means operatively associated with the punching and cutting means for removing the punched and cut slats from the punching and cutting means; and
 - lacing means downstream from said punching and cutting means operatively associated with the outfeed means and having a plurality of spaced lacing towers with tape ladders, said lacing means being receptive of the punched and cut slats for inserting the slats into said tape ladders and further including a guide means extending substantially the entire distance between adjacent lacing towers for guiding the slats into the lacing towers, wherein the guide means includes a cable strung between adjacent lacing towers.

2. An apparatus as defined in claim 1 wherein the cable has a first end and a second end with the first end operatively connected to one of the lacing towers and the second end operatively connected to a second adjacent lacing tower, and tensioning means operatively connected to the cable to place a predetermined tension in the cable.

3. An apparatus as defined in claim 2, wherein the tensioning means includes a free weight.

4. An apparatus as defined in claim 1, wherein the guide means further includes a guide trough at the upstream side of each lacing tower.

5. An apparatus as defined in claim 4 wherein the trough has an entrance at an upstream end thereof and an exit at a downstream end adjacent to the lacing tower, the trough further has a sloped bottom wall and a pair of diverging side walls, the bottom wall being sloped downwardly in an upstream direction so that the entrance of the trough is lower than the exit of the trough and the side walls being diverging in an upstream direction so that the entrance of the trough is wider than the exit of the trough.

6. An apparatus for assembling blinds from slat material , comprising:
 - supply means for supplying a continuous length of slat material;
 - punching and cutting means downstream from said supply means operatively connected to the supply means and receptive of the slat material for punching holes in the slat material at predetermined positions and for cutting the slat material into slats of predetermined length;

outfeed means operatively associated with the punching and cutting means for removing the punched and cut slats from the punching and cutting means;

lacing means downstream from said punching and cutting means operatively associated with the outfeed means and having a plurality of spaced lacing towers with tape ladders, said lacing means being receptive of the punched and cut slats for inserting slats into said tape ladders; and abutment means operatively associated with the lacing means for yieldingly arresting longitudinal motion of an incoming slat after it has completely entered the lacing means, wherein said abutment means includes a pivoted backstop, comprising:

a support assembly;

a backstop plate attached to the support assembly by a pivot pin; and absorbing means mounted to the support assembly and disposed in proximity to the backstop plate to yieldingly resist pivotal motion of the backstop plate in a first direction about the pivot pin.

7. An apparatus as defined in claim 6 wherein said absorbing means includes a shock absorber having a projecting pin disposed adjacent to the backstop plate.

8. An apparatus as defined in claim 6, said abutment means further including a cushioning pad attached to the support assembly and disposed in proximity to the backstop plate to yieldingly resist pivotal motion of the plate in a second opposite direction about the pivot pin.

9. An apparatus for assembling blinds from slat material, comprising:

supply means for supplying a continuous length of slat material;

punching and cutting means downstream from said supply means operatively connected to the supply means and receptive of the slat material for punching holes in the slat material at predetermined positions and for cutting the slat material into slats of predetermined length;

outfeed means operatively associated with the punching and cutting means for removing the punched and cut slats from the punching and cutting means, said outfeed means including:

a continuously driven outfeed drive roller, a pinch roller operatively associated with the outfeed drive roller; and motive means operatively connected to the pinch roller for selectively urging the pinch roller toward the outfeed drive roller;

a gate operatively associated with the outfeed means for movement between open and closed positions and disposed in the longitudinal path of movement of an outfed slat, said gate having a tapered cam surface in alignment with the path of movement of an outfed slat to allow the inertia of the slat to open the gate sufficiently for the slat to pass thereby; and lacing means downstream from said punching and cutting means operatively associated with the outfeed means and having a plurality of spaced lacing towers with tape ladders, said lacing means being receptive of the punched and cut slats for inserting the slats into said tape ladders.

10. An apparatus as defined in claim 9 wherein said gate is biased downwardly by the force of gravity into its closed position.

11. An apparatus as defined in claim 9, further including a coil spring operatively connected to the gate to bias the gate into its closed position.

12. An apparatus for assembling blinds from slat material, comprising:

supply means for supplying a continuous length of slat material;

punching and cutting means downstream from sail supply means operatively connected to the supply means and receptive of the slat material which is operative for punching holes in the slat material at predetermined positions and for cutting the slat material into slats of predetermined length;

outfeed means operatively associated with the punching and cutting means for removing the punched and cut slats from the punching and cutting means, said outfeed means including:

a gravity-driven gate operatively associated with said outfeed means and disposed in the longitudinal path of movement of an outfed slat, said gate having a tapered cam surface engageable by an outfed slat to allow the inertia of the slat to open the gate sufficiently for the slat to pass thereby;

a continuously driven outfeed drive roller;

a pinch roller operatively associated with the outfeed drive roller; and motive means operatively connected to the pinch roller for selectively urging the pinch roller toward the outfeed drive roller;

lacing means downstream from said punching and cutting means operatively associated with the outfeed means and having a plurality of spaced lacing towers with tape ladders, each tape ladder having a pair of longitudinally-extending stringers and a series of regularly-spaced transverse rungs, said lacing means being receptive of the punched and cut slats for inserting the slats into openings defined between the stringers and adjacent rungs of said tape ladders, said lacing means further including:

spring-biased spreader means for conditioning the tape ladders to allow incoming slats to be inserted into said openings of the tape ladder, said spreader means being adapted for permitting the longitudinal passage of the tape ladder while preventing converging lateral movement of the stringers; and guide means extending substantially the entire distance between adjacent lacing towers for guiding the slats into the lacing towers; and abutment means downstream from and operatively associated with the lacing means for yieldingly arresting longitudinal motion of an incoming slat after it has completely entered the lacing means, said abutment means further including:

a support assembly;

a backstop plate attached to the support assembly by a pivot pin; and absorbing means mounted to the support assembly and disposed in proximity to the backstop plate to yieldingly resist pivotal motion of the backstop plate in a first direction about the pivot pin.

13. An apparatus for assembling blinds from slat material, comprising:

supply means for supplying a continuous length of slat material;

punching and cutting means downstream from said supply means operatively connected to the supply means and receptive of the slat material for punching holes in the slat material at predetermined positions and for cutting the slat material into slats of predetermined length;

outfeed means operatively associated with the punching and cutting means for removing the punched and cut slats from the punching and cutting means;

lacing means downstream from said punching and cutting means operatively associated with the outfeed means and having a plurality of spaced lacing towers with tape ladders and sensors associated therewith, said lacing means being receptive of the punched and cut slats for inserting the slats into said tape ladders;

positioning means operatively associated with said lacing means for positioning the plurality of lacing towers and their associated sensors into desired positions;

advancing means including a pair of drive wheels operatively associated with the supply means for sequentially advancing a leading edge of a slat with the drive wheels to each sensor; and computer means operatively associated with the advancing means for storing information related to the amount of rotation of the drive wheels required to advance the slat to each sensor and for subsequently commanding the advancing means to advance the slats to the desired positions by using the previously stored information in order to manufacture subsequent slats.

14. An apparatus as defined in claim 13 wherein said advancing means includes means for advancing the slat at a speed that is relatively slow in comparison to a normal operational speed of the apparatus, for advancing a second slat at the normal operational speed to each sensor sequentially until a leading edge of the second slat is sensed at each sensor, and for creating advance signals related to the amount of rotation of the drive wheels required to advance the slat to each of the sensors at the normal operational speed; and wherein said computer means is further operative for utilizing said stored information to predict the amount of rotation of the drive wheels required to feed the slat to each of the sensors at said normal operational speed, for storing the advance signals, and for using the advance signals to compensate for any slippage in the drive wheels by driving the wheels in accordance with the advance signals in order to manufacture subsequent slats.

* * * * *